(12) United States Patent
Mangold et al.

(10) Patent No.: US 11,504,943 B2
(45) Date of Patent: Nov. 22, 2022

(54) HOLLOW BODY HAVING A WALL WITH A LAYER OF GLASS AND A PLURALITY OF PARTICLES

(71) Applicant: Schott AG, Mainz (DE)

(72) Inventors: Stephanie Mangold, Klein-Winternheim (DE); Eveline Rudigier-Voigt, Mainz (DE); Andrea Anton, Hüffelsheim (DE)

(73) Assignee: Schott AG, Mainz (DE)

( * ) Notice: Subject to any disclaimer, the term of this patent is extended or adjusted under 35 U.S.C. 154(b) by 398 days.

(21) Appl. No.: 16/408,771

(22) Filed: May 10, 2019

(65) Prior Publication Data
US 2019/0344918 A1    Nov. 14, 2019

(30) Foreign Application Priority Data
May 11, 2018 (EP) .................................... 18171782

(51) Int. Cl.
| | |
|---|---|
| B32B 1/02 | (2006.01) |
| B32B 5/30 | (2006.01) |
| B65D 1/02 | (2006.01) |
| A61J 1/14 | (2006.01) |
| C03C 17/30 | (2006.01) |

(52) U.S. Cl.
CPC .............. *B32B 5/30* (2013.01); *A61J 1/1468* (2015.05); *B32B 1/02* (2013.01); *B65D 1/0215* (2013.01); *C03C 17/30* (2013.01); *C03C 2217/78* (2013.01); *C03C 2218/111* (2013.01)

(58) Field of Classification Search
CPC .... B32B 1/02; B32B 3/00; B32B 3/02; B32B 3/26; B32B 3/263; B32B 5/16; B32B 5/30; B65D 1/02; B65D 1/0207; B65D 1/0215; B65D 1/40; A61J 1/1468; C03C 17/30; C03C 2217/78; C03C 2218/111
See application file for complete search history.

(56) References Cited

U.S. PATENT DOCUMENTS

| | | |
|---|---|---|
| 5,531,683 A | 7/1996 | Kriesel et al. |
| 9,428,302 B2 | 8/2016 | Fadeev et al. |
| (Continued) | | |

FOREIGN PATENT DOCUMENTS

| | | |
|---|---|---|
| EP | 2 088 086 A1 | 8/2009 |
| WO | 2011/029857 A2 | 3/2011 |
| WO | 2017/178584 A1 | 10/2017 |

OTHER PUBLICATIONS

Chinese Office Action dated Sep. 2, 2020 for Chinese Application No. 201910387945.6 (7 pages).

(Continued)

*Primary Examiner* — Walter Aughenbaugh
(74) *Attorney, Agent, or Firm* — Taylor IP, P.C.

(57) ABSTRACT

A hollow body includes a wall which at least partially surrounds an interior volume of the hollow body. The wall includes a layer of glass and has a wall surface. The wall surface includes a surface region in which the layer of glass is at least partially superimposed by a plurality of particles. The plurality of particles is characterized by a particle size distribution having a $D_{50}$ in a range from 1 to 100 μm. A hollow body having a wall surface including a surface region which is characterized by a coefficient of dry sliding friction of less than 0.15 is also provided.

17 Claims, 15 Drawing Sheets

(56) References Cited

U.S. PATENT DOCUMENTS

| | | | |
|---|---|---|---|
| 9,668,936 B2 | 6/2017 | Fadeev et al. | |
| 9,744,099 B2 | 8/2017 | Fadeev et al. | |
| 9,775,775 B2 | 10/2017 | Fadeev et al. | |
| 10,336,479 B2* | 7/2019 | Deutschle | B65D 11/10 |
| 11,167,885 B2* | 11/2021 | Rudigier-Voigt | C03C 23/006 |
| 2006/0246297 A1* | 11/2006 | Sakoske | C23C 4/18 |
| | | | 427/446 |
| 2013/0158485 A1* | 6/2013 | Siebers | A61M 5/346 |
| | | | 604/187 |
| 2014/0034544 A1* | 2/2014 | Chang | B65D 1/0207 |
| | | | 206/524.3 |

OTHER PUBLICATIONS

English translation of Chinese Office Action dated Sep. 2, 2020 for Chinese Application No. 201910387945.6 (9 pages).

De Rosa et al., "Scratch Resistant Polyimide Coatings for Aluminosilicate Glass Surfaces", The Journal of Adhesion, vol. 78, 2002, pp. 113-127 (15 pages).

Yamada et al., "Friction and Damage of Coatings Formed by Sputtering Polytetrafluoroethylene and Polyimide", Surface and Coatings Technology, 43/44 (1990), pp. 618-628 (11 pages).

Chen et al., "Preparation and characterization of self-assembled alkanephosphate monolayers on glass substrate coated with nano-TiO2 thin film", Materials Research Bulletin 36, 2001, pp. 2605-2612 (8 pages).

\* cited by examiner

300

400

500

600

HOLLOW BODY HAVING A WALL WITH A LAYER OF GLASS AND A PLURALITY OF PARTICLES

BACKGROUND OF THE INVENTION

1. Field of the Invention

The present invention is related to a hollow body including a wall which at least partially surrounds an interior volume of the hollow body and comprises a layer of glass. Further, the invention is related to a process for making an item; to a hollow body, obtainable by that process; to a closed container; to a process for packaging a pharmaceutical composition; to a closed hollow body obtainable by this process; to a use of a hollow body for packaging a pharmaceutical composition; and to a use of a plurality of particles.

2. Description of the Related Art

Containers made from glass have been applied for transporting fluids and powders safely for several centuries. In the last decades, the arts in which glass containers are used for transporting fluids and powders have become increasingly diverse and sophisticated. One such art is the technical field of the present application: pharmaceutical packaging. In the pharmaceutical industry, glass containers—such as vials, syringes, ampules and cartridges—are applied as primary packaging for all kinds of pharmaceutically relevant compositions, in particular drugs, such as vaccines. Specifically in this art, the requirements put on the glass containers have become more and more sophisticated, recently.

Glass containers for pharmaceutical packaging are typically cleaned, sterilized, filled and closed, on an industrial scale in a line of processing, referred to as filling line. There is a need to increase a production rate of such a filling line in the art. This may be implemented by increasing a velocity of the filling line and/or by reducing shut down times due to disruptions of the processing. In the prior art, such disruptions are typically caused by the occurrence of breakage of glass containers during processing, in particular due to high transportation velocities on the filling line. If such breakage occurs, production has to be stopped, the line has to be cleaned thoroughly from particles and dust and then the system has to be readjusted before it is started again. Contamination of the glass containers with any kind of pharmaceutically relevant particles, in particular glass particles, or pharmaceutically relevant substances has to be avoided strictly, in particular if parenterals are packaged.

Further, scratching of the glass surfaces of the containers has to be avoided as far as possible. Scratches on the container surface may hamper an optical inspection of the filled containers, in particular for the presence of pharmaceutically relevant particles. Further, scratching can lead to glass particles or dust being disassociated from the containers. These particles and dust may contaminate the containers on the filling line.

In general, attempts to solve the above problems by applying a coating to the container surface are known in the prior art. The requirements on such coatings are rather sophisticated. They have to withstand high temperatures which occur in a sterilization treatment referred to in the art as depyrogenation. Further, the coatings have to withstand low temperature treatments such as freeze drying. Even more, the coatings have to withstand washing processes, which include increased temperatures and mechanical influences. This means that the advantageous properties which the coating provides to the exterior surface of the container have to be maintained and, in addition, contamination of the container interior with any pharmaceutically relevant particle or substance from the coating has to be avoided. The preceding sophisticated requirements have led to the development of rather complex multilayer coatings of the prior art. Such multilayer coatings are typically complex and costly to apply and thus, run contrary to the need for high processing rates.

What is needed in the art is a way to at least partly overcome the previously described disadvantages arising from the prior art.

SUMMARY OF THE INVENTION

Exemplary embodiments provided according to the present disclosure provide a glass container for pharmaceutical packaging which allows for an increase of a production rate of a filling line. Further, exemplary embodiments disclosed herein provide a glass container for pharmaceutical packaging which allows for an increase of a processing speed of a filling line, or for a reduction of disruptions of a filling line, or both. Exemplary embodiments disclosed herein further provide a glass container for pharmaceutical packaging which shows a reduced tendency to being damaged or even broken while being processed on a filling line. Exemplary embodiments disclosed herein further provide a glass container for pharmaceutical packaging which shows a reduced sliding friction, in particular at at least a part of its exterior surface. In some embodiments, one of the above advantageous containers is provided, wherein the container is further suitable for an easy and reliable optical inspection after having been filled. In some embodiments, one of the above advantageous containers is provided, wherein the container is further suitable for a post-treatment, for example a sterilization treatment, which may be effected as a high-temperature-treatment—in particular a depyrogenation; or a washing process; or a low-temperature-treatment—in particular a freeze drying. In some embodiments, one of the above advantageous containers is provided, wherein the container does not show an increased tendency to being contaminated in a pharmaceutically relevant manner; the container may, for example, show a reduced tendency to being contaminated. The preceding contamination refers, in particular, to the presence of pharmaceutically relevant particles in the container interior. In some embodiments, one of the above advantageous containers is provided, wherein the container does not have a multilayer coating on a surface, such as the exterior surface, of the glass container. In particular, no primer layer is needed here.

In some exemplary embodiments provided according to the present invention, a hollow body includes a wall which at least partially surrounds an interior volume of the hollow body. The wall includes a layer of glass, and has a wall surface. The wall surface includes a surface region in which the layer of glass is at least partially superimposed by a plurality of particles. The plurality of particles is characterized by a particle size distribution having a $D_{50}$ in a range from 1 to 100 µm, such as from 1 to 80 µm, from 1 to 60 µm, from 1 to 40 µm, from 1 to 20 µm, from 1 to 15 µm, from 2 to 10 µm, or from 2 to 6 µm. In some embodiments, the $D_{50}$ of the particle size distribution is in a range from 2 to 100 µm, such as from 2 to 80 µm, from 2 to 60 µm, from 2 to 40 µm, from 2 to 20 µm, from 2 to 15 µm, from 2 to 10 µm, or from 2 to 6 µm. The plurality of particles may form at least a part of the wall surface in the surface region. In some embodiments, the particle size distribution of the plurality of particles, additionally, has a $D_{10}$ in a range from 0.1 to 50 µm, such as from 0.5 to 10 µm, from 0.5 to 5 µm, or from 1 to 3 µm; or a $D_{90}$ in a range from 0.5 to 100 µm, such as from 0.5 to 50 µm, from 1 to 20 µm, or from 2 to 10 µm; or both.

In some embodiments, at least the surface region of the wall surface is characterized by a coefficient of dry sliding friction of less than 0.15, such as less than 0.1, less than 0.05, or less than 0.02. The surface region may be a region of a surface of the layer of glass. The wall surface may be a surface of the layer of glass. In some embodiments, the particles of the plurality of particles are directly joined to an adjacent layer of the wall via Van-der-Waals forces, but not via covalent bonds.

In some embodiments, the particles of the plurality of particles are selected from the group consisting of organic particles, inorganic particles, and hybrid polymer particles, or a combination of at least two thereof. Here, a combination of at least two of the preceding types of particles refers to a plurality of particles which comprises particles of at least two different types from the preceding list. Further, the particles of the plurality of particles may be organic particles, or hybrid polymer particles, or both.

In some embodiments, the inorganic particles comprise, or consist of, one selected from the group consisting of a boron nitride, a molybdenum sulfide, a silicon nitride, an oxide, and a compound which includes covalently bonded H, or a combination of at least two thereof. An exemplary molybdenum sulfide is $MoS_2$. An exemplary silicon nitride is $Si_3N_4$. An exemplary oxide is a silicon oxide or a titanium oxide or both. An exemplary silicon oxide is $SiO_2$. An exemplary titanium oxide is $TiO_2$. An exemplary inorganic compound which includes covalently bonded H is a siloxane, or a silane, or both.

In some embodiments, the organic particles comprise, or consist of, a compound which includes covalently bonded H. An exemplary organic compound which includes covalently bonded H is a polymer of one or more siloxanes, or an organo-silane, or both. Additionally or alternatively, organic particles which comprise a compound which includes covalently bonded H comprise this compound as part of a latex, or of a silicone resin, or both.

In some embodiments, the hybrid polymer particles comprise, or consist of, a compound which includes covalently bonded H. An exemplary hybridpolymer compound which includes covalently bonded H is a hybridpolymer silane, or a hybridpolymer siloxane, or both. An exemplary hybridpolymer siloxane is a polyorganosiloxane, or a polyalkylsiloxane.

In some embodiments, the particles of the plurality of particles comprise, or consist of, a compound which includes covalently bonded H. An exemplary compound including covalently bonded H is a silane, or a siloxane, or both. An exemplary silane is an inorganic silane, or a hybridpolymer silane. An exemplary siloxane is one selected from the group consisting of an inorganic siloxane, a polymer of one or more siloxanes, an organo-silane, and a hybridpolymer siloxane or both. Additionally or alternatively, particles which comprise a compound which includes covalently bonded H comprise this compound as part of a latex, or of a silicone resin, or both.

In some embodiments, the particles of the plurality of particles adjoin the layer of glass in the surface region of the wall surface. The particles of the plurality of particles may be directly joined to the layer of glass via Van-der-Waals forces, or via covalent bonds, or both. Here, exemplary covalent bonds are Si—O-bonds. In an exemplary Si—O-bond, the Si is bonded via one O, or via two O to the layer of glass. In some embodiments, the particles of the plurality of particles are directly joined to the layer of glass via Van-der-Waals forces, but not via covalent bonds.

In some embodiments, the particles of the plurality of particles are not superimposed by any component of the wall surface on a side of the particles of the plurality of particles which faces away from the layer of glass. In some embodiments, the particles of the plurality of particles are not embedded in any material, such as a matrix, for example a polymer matrix. In a case in which the plurality of particles superimposes the layer of glass on a side of the layer of glass which faces away from the interior volume, the plurality of particles may adjoin an environment of the hollow body. In a case in which the plurality of particles superimposes the layer of glass on a side of the layer of glass which faces the interior volume, the plurality of particles may adjoin the interior volume or a content which has been filled into the interior volume, such as a pharmaceutical composition.

In some embodiments, the plurality of particles superimposes the layer of glass at 1 to 50%, such as at 5 to 40%, at 5 to 35%, at 10 to 30%, or at 10 to 25%, in each case of a total surface area of the surface region. Hence, here the plurality of particles superimposes the layer of glass in the surface region of the wall surface at a cover ratio in the preceding range.

In some embodiments, the particle size distribution has a full width at half maximum (FWHM) which is less than 30%, such as less than 25%, less than 20%, less than 15%, or less than 10%, in each case of the $D_{50}$ of the particle size distribution.

In some embodiments, the particles of the plurality of particles are characterized by an aspect ratio in a range from 0.5 to 1.5, such as from 0.6 to 1.4, from 0.7 to 1.3, from 0.8 to 1.2, or from 0.9 to 1.1. In some embodiments, the particles of the plurality of particles are spherical.

In some exemplary embodiments provided according to the present disclosure, a hollow body includes a wall which at least partially surrounds an interior volume of the hollow body. The wall includes a layer of glass and has a wall surface. The wall surface includes a surface region which is characterized by a coefficient of dry sliding friction of less than 0.15, such as less than 0.1, less than 0.05, or less than 0.02.

In some embodiments, the surface region is further characterized by a contact angle for wetting with water in a range from 0 to 45°, such as from 5 to 45° or 10 to 45°.

In some embodiments, the wall surface includes an interior surface which faces the interior volume, and an exterior surface which faces away from the interior volume. The interior surface, or the exterior surface, or both includes the surface region. The exterior surface may include the surface region. In some embodiments, the layer of glass is not superimposed by the plurality of particles in any part region of the interior surface. Hence, in some embodiments the interior surface does not comprise any particle of the plurality of particles. The interior surface may be a surface of the layer of glass. Additionally or alternatively, the exterior surface may be a surface of the layer of glass. In some embodiments, the plurality of particles superimposes the layer of glass on an area which is at least 10%, such as at least 20%, at least 30%, at least 40%, at least 50%, at least 60%, at least 70%, at least 80%, at least 90%, in each case of a total surface area of the exterior surface, or across the full exterior surface. The surface area may form at least 10%, at least 20%, at least 30%, at least 40%, at least 50%, at least 60%, at least 70%, at least 80%, at least 90%, in each case of the exterior surface, or the full exterior surface. In some embodiments, the wall surface consists of the interior surface and the exterior surface. The hollow body may include a neck and the layer of glass is not superimposed by any particle of the plurality of particles from the neck upwards, but may across the complete exterior surface below the neck.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. The container may be suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the wall includes from top to bottom of the hollow body a top region; a body region, which follows the top region via a shoulder; and a bottom region, which follows the body region via a heel.

In some embodiments, the body region is a lateral region of the hollow body. The body region of the wall may form a hollow cylinder. In some embodiments, one selected from the group consisting of the body region, the shoulder, the bottom region, and the heel, or a combination of at least two thereof includes the surface region. The body region, or the shoulder, or both may include the surface region. In a case in which the surface region is comprised by two or more of the preceding regions of the wall, the surface region may be a non-coherent region which consists of two or more distinct part regions. However, the surface region may be a coherent region. The top region may comprise, or consist of, from top to bottom of the hollow body a flange and a neck. In some embodiments, the layer of glass is not superimposed by any particle of the plurality of particles across the neck, or the flange, or not across any of both.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. In some embodiments, throughout the body region a thickness of the layer of glass is in a range from 0.9 to 1.1 mm or in a range from 1.5 to 1.7 mm.

In some embodiments, the glass is of a type selected from the group consisting of a type I glass, a borosilicate glass, an aluminosilicate glass, and fused silica; or of a combination of at least two thereof.

In some embodiments, the hollow body has a first transmission coefficient for a transmission of light of a wavelength in a range from 400 nm to 2300 nm, such as from 400 to 500 nm or from 430 to 490 nm, through the hollow body not via the surface region, such as not via any region of the wall surface which includes particles of the plurality of particles, wherein the hollow body has a further transmission coefficient for a transmission of light of a wavelength in a range from 400 nm to 2300 nm, such as from 400 to 500 nm or from 430 to 490 nm, through the hollow body via the surface region, wherein a ratio of the first transmission coefficient to the further transmission coefficient is in a range from 0.95 to 1.05, such as from 0.99 to 1.01 or from 0.995 to 1.005. In some embodiments, the first and the further transmission coefficients hold for light of each wavelength in the range from 400 nm to 2300 nm, such as from 400 to 500 nm or from 430 to 490 nm.

In some embodiments, the hollow body has a first haze for a transmission of light through the hollow body not via the surface region, such as not via any region of the wall surface which includes particles of the plurality of particles, wherein the hollow body has a further haze for a transmission of light through the hollow body via the surface region, wherein the further haze is in a range from 95.0 to 105.0%, such as from 99.7 to 100.3%, from 99.8 to 100.2%, from 99.9 to 100.1%, or from 100 to less than 100.1%, in each case of the first haze. The above haze values may refer to a hollow body having an interior volume of about 2 ml and to a transmission of the light through a part of the hollow body which is of the shape of a hollow cylinder.

In some embodiments, the hollow body has a transmission coefficient for a transmission of light of a wavelength in a range from 400 nm to 2300 nm, such as from 400 to 500 nm or from 430 to 490 nm, through the hollow body via the surface region, of more than 0.7, such as more than 0.75, more than 0.8, or more than 0.82.

In some embodiments, the hollow body has a haze for a transmission of light through the hollow body via the surface region in a range from 5 to 50%, such as from 10 to 40%, from 10 to 35%, from 15 to 25%, or from 15 to 22%.

In some embodiments, towards the interior volume the layer of glass is at least partially superimposed by an alkali metal barrier layer, or by a hydrophobic layer, or both.

In some embodiments, the interior volume comprises a pharmaceutical composition.

In some exemplary embodiments provided according to the present disclosure, a process for making an item comprises as process steps:

a) providing a hollow body including a wall which at least partially surrounds an interior volume of the hollow body, the wall including a layer of glass and having a wall surface;

b) superimposing at least a part of the layer of glass with a composition comprising a first plurality of particles, and a vehicle; and c) decreasing a proportion of the vehicle in the composition, thereby leaving at least a part of the first plurality of particles, or a further plurality of particles, which is obtained in the process step c) from at least a part of the first plurality of particles, or a combination of the first and the further plurality of particles superimposed on the layer of glass in a surface region of the wall surface. The first plurality of particles is characterized by a first particle size distribution having a $D_{50}$ in a range from 1 to 100 μm, such as from 1 to 80 μm, from 1 to 60 μm, from 1 to 40 μm, from 1 to 20 μm, from 1 to 15 μm, from 2 to 10 μm, or from 2 to 6 μm. In some embodiments, the $D_{50}$ of the first particle size distribution is in an range from 2 to 100 μm, such as from 2 to 80 μm, from 2 to 60 μm, from 2 to 40 μm, from 2 to 20 μm, from 2 to 15 μm, from 2 to 10 μm, or from 2 to 6 μm. The further plurality of particles may be characterized by a further particle size distribution having a $D_{50}$ in a range from 1 to 100 μm, such as from 1 to 80 μm, from 1 to 60 μm, from 1 to 40 μm, from 1 to 20 μm, from 1 to 15 μm, from 2 to 10 μm, or from 2 to 6 μm. In some embodiments, the $D_{50}$ of the further particle size distribution is in an range from 2 to 100 μm, such as from 2 to 80 μm, from 2 to 60 μm, from 2 to 40 μm, from 2 to 20 μm, from 2 to 15 μm, from 2 to 10 μm, or from 2 to 6 μm. The $D_{50}$ of the further particle size distribution may be less than the $D_{50}$ of the first particle size distribution, such as by at least 100 nm, at least 500 nm, or at least 800 nm, but typically not more than 2 μm, such as not more than 1 μm. In some embodiments, the particle size distribution of the first plurality of particles, additionally, has a $D_{10}$ in an range from 0.1 to 50 μm, such as from 0.5 to 10 μm, from 0.5 to 5 μm, or from 1 to 3 μm; or a $D_{90}$ in a range from 0.5 to 100 μm, such as from 0.5 to 50 μm, from 1 to 20 μm, or from 2 to 10 μm; or both. In some embodiments, the particle size distribution of the further plurality of particles, additionally, has a $D_{10}$ in an range from 0.1 to 50 μm, such as from 0.5 to 10 μm, from 0.5 to 5 μm, or from 1 to 3 μm; or a $D_{90}$ in a range from 0.5 to 100 μm, such as from 0.5 to 50 μm, from 1 to 20 μm, or from 2 to 10 μm; or both.

In some embodiments, the decreasing in the process step c) comprises adjusting a temperature of the layer of glass, or the first plurality of particles, or both, such as by heating the layer of glass, or the first plurality of particles, or both, at least partially to a temperature in a range from 15 to 650° C., such as from 20 to 650° C., from 25 to 650° C., from 30 to 650° C., from 50 to 650° C., from 100 to 650° C., from 150 to 650° C., from 200 to 650° C., from 250 to 650° C., from 300 to 650° C., from 350 to 650° C., or from 400 to 650° C. The temperature may be kept in the preceding range for a duration in a range from 1 min to 24 h, such as from 1 min to 12 h, from 3 min to 6 h, from 3 min to 3 h, or from 5 min to 3 h. In some embodiments, the particles of the further plurality of particles are obtainable from the particles of the first plurality of particles via a chemical reaction. Here, an exemplary chemical reaction is an oxidation. In some embodiments, in the process step b) the composition comprises the vehicle at a proportion in a range from 50 to 99.9 wt.-%, such as 80 to 99.5 wt.-% or 90 to 99.5 wt.-%, based on the weight of the composition in the process step b). In the process step c), the proportion of the vehicle in the composition may be decreased by at least 50%, such as at least 60%, at least 70%, at least 80%, at least 90%, or at least 95%, in each case based on a proportion of the vehicle in the composition in the process step b). In some embodiments, in the process step c), the proportion of the vehicle in the composition is decreased to a value in a range from 50 to 100 wt.-%, such as 60 to 100 wt.-%, 70 to 100 wt.-%, 80 to 100 wt.-%, 90 to 100 wt.-%, 95 to 100 wt.-%, or 99 to 100 wt.-%, in each case based on the weight of the residuals of the composition which are left superimposed on the layer of glass after the process step c). In some embodiments, the process step c) comprises completely evaporating the vehicle from the composition.

In some embodiments, the particles which are left superimposed on the layer of glass in the surface region of the wall surface in the process step c) are not superimposed by any component of the wall surface on a side of the particles which faces away from the layer of glass. In some embodiments, these particles are not embedded in any material, such as a matrix, for example a polymer matrix. In a case in which the particles superimpose the layer of glass on a side of the layer of glass which faces away from the interior volume, the particles may adjoin an environment of the hollow body. In a case in which the particles superimpose the layer of glass on a side of the layer of glass which faces the interior volume, the particles may adjoin the interior volume or a content which has been filled into the interior volume, which may be a pharmaceutical composition. In some embodiments, in the process step b) the composition does not comprise any component other than the first plurality of particles which is left itself or in form of a component obtained therefrom through the process step c) superimposed on the layer of glass at a proportion of more than 10 wt.-%, such as more than 5 wt.-%, more than 3 wt.-%, or more than 1 wt.-%, based on the weight of the residuals of the composition which are left superimposed on the layer of glass after the process step c). Hence, the residuals of the composition which are left superimposed on the layer of glass after the process step c) do not comprise any component which is different from the particles of the first and the further plurality of particles at a proportion of more than 10 wt.-%, such as more than 5 wt.-%, more than 3 wt.-%, or more than 1 wt.-%, based on the weight of these residuals. In some embodiments, the particles of the first and the further plurality of particles together make up at least 90 wt.-%, such as at least 95 wt.-%, at least 97 wt.-%, or at least 99 wt.-%, in each case of a weight of the residuals of the composition which are left superimposed on the layer of glass after the process step c). In some embodiments, after the process step c) the at least part of the particles of the first plurality of particles, or the further plurality of particles, or both are directly joined to the wall surface, which may be a surface of the layer of glass, via Van-der-Waals forces, but not via covalent bonds.

In some embodiments, the item is the previously described hollow body.

In some embodiments, the wall surface includes an interior surface which faces the interior volume, and an exterior surface which faces away from the interior volume; wherein in the process step b) the layer of glass is superimposed with the composition on the interior surface, or the exterior surface, or both. In some embodiments, in the process step b) the layer of glass is not superimposed with the composition in any part region of the interior surface. Hence, in some embodiments the layer of glass is not superimposed by any particle of the plurality of particles towards the interior surface. The interior surface may be a surface of the layer of glass. Additionally or alternatively, the exterior surface is a surface of the layer of glass. In some embodiments, in the process step b) the composition is superimposed on the layer of glass across an area which is at least 10%, such as at least 20%, at least 30%, at least 40%, at least 50%, at least 60%, at least 70%, at least 80%, or at least 90%, in each case of a total surface area of the exterior surface, such as across the full exterior surface. In some embodiments, the hollow body comprises a neck and in the process step b) the composition is not superimposed on the layer of glass from the neck upwards, but may be across the complete exterior surface below the neck. In some embodiments, the wall surface consists of the interior surface and the exterior surface.

In some embodiments, in the process step b) the composition comprises the first plurality of particles at a proportion in a range from 0.1 to 25 wt.-%, such as from 1 to 15 wt.-% or from 2 to 8 wt.-%, in each case based on the weight of the composition in the process step b).

In some embodiments, in the process step b) the composition is a dispersion. An exemplary dispersion is a suspension, or a colloid, or both.

In some embodiments, the vehicle is an organic vehicle, or an inorganic vehicle, or both. An exemplary organic vehicle comprises alkyl groups with less than 7 C-atoms. Additionally or alternatively, the organic vehicle is an alcohol. An exemplary alcohol is ethanol, or isopropanol, or both. An exemplary inorganic vehicle is water. The vehicle may be, for example, a solvent.

In some embodiments, in the process step b) the layer of glass is contacted with the composition. In some embodiments, in the process step c) the particles of the first plurality of particles, or of the further plurality of particles, or both are joined to the layer of glass, such as by establishing Van-der-Waals forces, or covalent bonds, or both between the respective particles and the layer of glass. Here, exemplary covalent bonds are Si—O-bonds. In an exemplary Si—O-bond, the Si is bonded via one 0, or via two 0 to the layer of glass.

In some embodiments, the composition further comprises a dispersing agent, or a chemical bonding agent, or both. An exemplary stabilizer has a viscosity in a range from $5 \cdot 10^{-4}$ to $100 \cdot 10^{-4}$ m$^2$/s. An exemplary chemical bonding agent is an alkoxysilane or a chlorosilane or both.

In some embodiments, prior to the process step b) the process comprises a step of pre-hydrolyzing the first plurality of particles.

In some embodiments, the pre-hydrolyzing comprises at least partially contacting the first plurality of particles with a chemical bonding agent. An exemplary chemical bonding agent is an alkoxysilane or a chlorosilane or both.

In some embodiments, the pre-hydrolyzing comprises adjusting, such as heating, a temperature of the first plurality of particles to be in a range from 15 to 45° C.

In some embodiments, the process step b), or c), or both comprises adjusting a coefficient of dry sliding friction of the surface region to be less than 0.15, such as less than 0.1, less than 0.05, or less than 0.02.

In some embodiments, the process step b), or c), or both comprises adjusting a contact angle of the surface region for wetting with water to a value in a range from 0 to 45°, such as from 5 to 45° or 10 to 45°.

In some embodiments, the particles of the first plurality of particles, or the particles of the further plurality of particles, or both are selected from the group consisting of organic particles, inorganic particles, and hybrid polymer particles, or a combination of at least two thereof. In some embodiments, the particles of the first plurality of particles are organic particles, or hybrid polymer particles, or a mixture of both. Additionally or alternately, the particles of the further plurality of particles are inorganic particles. Here, a combination of at least two of the preceding types of particles refers to a situation in which the first or the further plurality of particles or each of both or both in combination comprises particles of at least two different types from one of the preceding lists.

In some embodiments, the inorganic particles comprise one selected from the group consisting of a boron nitride, a molybdenum sulfide, a silicon nitride, an oxide, and a compound which includes covalently bonded H, or a combination of at least two thereof. An exemplary molybdenum sulfide is MoS$_2$. An exemplary silicon nitride is Si$_3$N$_4$. An exemplary oxide is a silicon oxide or a titanium oxide or both. An exemplary silicon oxide is SiO$_2$. An exemplary titanium oxide is TiO$_2$. An exemplary inorganic compound which includes covalently bonded H is a siloxane, or a silane, or both.

In some embodiments, the organic particles comprise a compound which includes covalently bonded H. An exemplary organic compound which includes covalently bonded H is a polymer of one or more siloxanes, or an organo-silane, or both. Additionally or alternatively, organic particles which comprise a compound which includes covalently bonded H comprise this compound as part of a latex, or of a silicone resin, or both.

In some embodiments, the hybrid polymer particles comprise a compound which includes covalently bonded H. An exemplary hydrbridpolymer compound which includes covalently bonded H is a hybridpolymer silane, or a hybridpolymer siloxane, or both. An exemplary hybridpolymer siloxane is a polyorganosiloxane, such as a polyalkylsiloxane.

In some embodiments, the particles of the first plurality of particles, or the particles of the further plurality of particles, or both comprise a compound which includes covalently bonded H. An exemplary compound including covalently bonded H is a silane, or a siloxane, or both. An exemplary silane is an inorganic silane, or a hybridpolymer silane. An exemplary siloxane is one selected from the group consisting of an inorganic siloxane, a polymer of one or more siloxanes, an organo-silane, and a hybridpolymer siloxane or both. Additionally or alternatively, particles which comprise a compound which includes covalently bonded H comprise this compound as part of a latex, or of a silicone resin, or both.

In some embodiments, after the process step c) the at least part of the first plurality of particles, or the further plurality of particles, or both in combination superimposes the layer of glass at 1 to 50%, such as at 5 to 40%, at 5 to 35%, at 10 to 30%, or at 10 to 25%, in each case of a total surface area of the surface region. Hence, here the preceding particles superimpose the layer of glass in the surface region of the wall surface at a cover ratio in the preceding range.

In some embodiments, the first particle size distribution has a full width at half maximum which is less than 30%, such as less than 25%, less than 20%, less than 15%, or less than 10%, in each case of the $D_{50}$ of the first particle size distribution. In some embodiments, also a further particle size distribution of the further plurality of particles has a full width at half maximum which is less than 30%, such as less than 25%, less than 20%, less than 15%, or less than 10%, in each case of a $D_{50}$ of the further particle size distribution.

In some embodiments, the particles of the first plurality of particles, or the particles of the further plurality of particles, or both are characterized by an aspect ratio in a range from 0.5 to 1.5, such as from 0.6 to 1.4, from 0.7 to 1.3, from 0.8 to 1.2, or from 0.9 to 1.1. The particles of the first plurality of particles, or the particles of the further plurality of particles, or both may be spherical.

In some embodiments, prior to the process step b) the process comprises a step of at least partially decreasing a contact angle for wetting with water of the wall surface, such as at least in the surface region, by a surface-treatment. The contact angle for wetting with water may be decreased across the full interior surface or exterior surface or both. In some embodiments, the contact angle for wetting with water is decreased across the full wall surface by the surface-treatment. Further, the contact angle for wetting with water of the wall surface may be at least partially decreased to less than 30°, such as less than 20° or less than 10°.

In some embodiments, the surface-treatment is selected from the group consisting of a plasma treatment, a flame treatment, a corona treatment, and a wet chemical treatment; or a combination of at least two thereof. An exemplary plasma treatment comprises contacting the wall surface with a plasma obtained from an O-comprising plasma precursor, or from a corona discharge, or both. An exemplary plasma precursor is a gas.

In some embodiments, the superimposing in the process step b) comprises one selected from the group consisting of a spraying, a dipping, and a printing; or a combination of at least two thereof. An exemplary printing is a contact printing or a contact-less printing or both. An exemplary contact printing is a tampon printing or a screen printing or both. An exemplary contact-less printing is an inkjet printing.

In some embodiments, in the process step a) the hollow body has a first transmission coefficient for a transmission of light of a wavelength in a range from 400 nm to 2300 nm, such as from 400 to 500 nm or from 430 to 490 nm, through the hollow body via the surface region, wherein after the process step c) the hollow body has a further transmission coefficient for a transmission of light of a wavelength in a range from 400 nm to 2300 nm, such as from 400 to 500 nm or from 430 to 490 nm, through the hollow body via the surface region, wherein a ratio of the first transmission coefficient to the further transmission coefficient is in a range from 0.95 to 1.05, such as from 0.99 to 1.01 or from 0.995 to 1.005. The first and the further transmission coefficients may hold for light of each wavelength in the range from 400 nm to 2300 nm, such as from 400 to 500 nm or from 430 to 490 nm.

In some embodiments, after the process step c) the hollow body has a transmission coefficient for a transmission of light of a wavelength in a range from 400 nm to 2300 nm, such as from 400 to 500 nm or from 430 to 490 nm, through the hollow body via the surface region, of more than 0.7, such as more than 0.75, more than 0.8, or more than 0.82. The transmission coefficient may hold for light of each wavelength in the range from 400 nm to 2300 nm, such as from 400 to 500 nm or from 430 to 490 nm.

In some embodiments, in the process step a) the hollow body has a first haze for a transmission of light through the hollow body via the surface region, wherein after the process step c) the hollow body has a further haze for a transmission of light through the hollow body via the surface region, wherein the further haze is in a range from 95.0 to 105.0%, such as from 99.7 to 100.3%, from 99.8 to 100.2%, from 99.9 to 100.1%, or from 100 to less than 100.1%, in each case of the first haze. In some embodiments, the above haze values refer to a hollow body having an interior volume of about 2 ml and to a transmission of the light through a part of the hollow body which is of the shape of a hollow cylinder.

In some embodiments, after the process step c) the hollow body has a haze for a transmission of light through the hollow body via the surface region in a range from 5 to 50%, such as from 10 to 40%, from 10 to 35%, from 15 to 25%, or from 15 to 22%. In some embodiments, the preceding haze values refer to a hollow body having an interior volume of about 2 ml and to a transmission of the light through a part of the hollow body which is of the shape of a hollow cylinder.

In some embodiments, the process further comprises a process step d) of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, or the full wall surface, is heated in the process step d) as outlined in the preceding. The heating in the process step d) may be a measure of a depyrogenation step.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. The container may be suitable for packaging parenteralia in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the wall comprises from top to bottom of the hollow body: a top region; a body region, which follows the top region via a shoulder; and a bottom region, which follows the body region via a heel. The body region may be a lateral region of the hollow body. The body region of the wall may form a hollow cylinder. In some embodiments, in the process step b) the layer of glass is superimposed with the composition in one selected from the group consisting of the body region, the shoulder, the bottom region, and the heel, or a combination of at least two thereof. In some embodiments, in the process step b) the layer of glass is superimposed with the composition in the body region, or the shoulder, or both. In the process step b) the layer of glass may be superimposed with the composition in one or more coherent regions of the all surface. Accordingly, the surface region may be a non-coherent region which consists of two or more distinct part regions. However, the surface region may be a coherent region, i.e., the process step b) the layer of glass is superimposed with the composition in a single coherent region of the all surface. The top region may comprise, or consist of, from top to bottom of the hollow body a flange and a neck. In some embodiments, in the process step b) the layer of glass is not superimposed with the composition across the neck, or the flange, or not across both.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. In some embodiments, throughout the body region a thickness of the layer of glass is in a range from 0.9 to 1.1 mm or in a range from 1.5 to 1.7 mm.

In some embodiments, the glass is of a type selected from the group consisting of a type I glass, a borosilicate glass, an aluminosilicate glass, and fused silica; or of a combination of at least two thereof.

In some embodiments, towards the interior volume the layer of glass is at least partially superimposed by an alkali metal barrier layer, or by a hydrophobic layer, or both.

A hollow body may obtainable by the previously described process and show the technical features of the previously described hollow body.

In some embodiments, a closed container is provided that includes a wall. The wall at least partially surrounds an interior volume which comprises a pharmaceutical composition; the wall comprises a layer of glass, and has a wall surface comprising a surface region. The closed container meets one criterion, selected from the group consisting of A. to C. as set forth below:

A. in the surface region the layer of glass is at least partially superimposed by a plurality of particles, the plurality of particles being characterized by particle size distribution having a $D_{50}$ in a range from 1 to 100 µm;

B. the surface region is characterized by a coefficient of dry sliding friction of less than 0.15; or C. both of A. and B.

In some embodiments, the closed container shows the technical features of the previously described hollow body.

In some embodiments, a process is provided that comprises as process steps:
- A) providing the hollow body;
- B) inserting a pharmaceutical composition into the interior volume; and
- C) closing the hollow body.

The closing in the process step C) may comprise contacting the hollow body with a closure, such as a lid, covering an opening of the hollow body with the closure, and joining the closure to the hollow body. The joining may comprise creating a form-fit of the hollow body, such as of the flange of the hollow body, with the closure. The form-fit may be created via a crimping step. The process may be a process for packaging the pharmaceutical composition.

In some embodiments, prior to the process step B) the process further comprises a step of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, or the full wall surface, is heated as outlined in the preceding. The heating may be a measure of a depyrogenation step.

In some embodiments, a closed hollow body is obtainable by the previously described process.

In some embodiments, a process 3 comprises as process steps:
- A. providing the previously described hollow body, closed container, or closed hollow body; and
- B. administering the pharmaceutical composition to a patient.

In some embodiments, a use of the previously described hollow body for packaging a pharmaceutical composition is provided. The packaging may comprise inserting the pharmaceutical composition into the interior volume and closing the hollow body.

In some embodiments, a use of a plurality of particles is provided for adjusting a coefficient of dry sliding friction of a surface of glass of a container, which may be at least a part region of an exterior surface of the container, to be less than 0.15, such as less than 0.1, less than 0.05, or less than 0.02. The plurality of particles is characterized by particle size distribution having a $D_{50}$ in a range from 1 to 100 µm, such as from 1 to 80 µm, from 1 to 60 µm, from 1 to 40 µm, from 1 to 20 µm, from 1 to 15 µm, from 2 to 10 µm, or from 2 to 6 µm. In some embodiments, the $D_{50}$ of the particle size distribution is in an range from 2 to 100 µm, such as from 2 to 80 µm, from 2 to 60 µm, from 2 to 40 µm, from 2 to 20 µm, from 2 to 15 µm, from 2 to 10 µm, or from 2 to 6 µm. In some embodiments, the particle size distribution of the plurality of particles, additionally, has a $D_{10}$ in an range from 0.1 to 50 µm, such as from 0.5 to 10 µm, from 0.5 to 5 µm, or from 1 to 3 µm; or a $D_{90}$ in a range from 0.5 to 100 µm, such as from 0.5 to 50 µm, from 1 to 20 µm, or from 2 to 10 µm; or both. An exemplary container is a pharmaceutical packaging container, which may be selected from the group consisting of a vial, a syringe, a cartridge, and an ampoule; or a combination of at least two thereof.

In some embodiments, the plurality of particles is further used for adjusting a contact angle for wetting with water of the surface of glass to be in a range from 0 to 45°, such as from 5 to 45° or 10 to 45°.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Hollow Body

Figure 1:
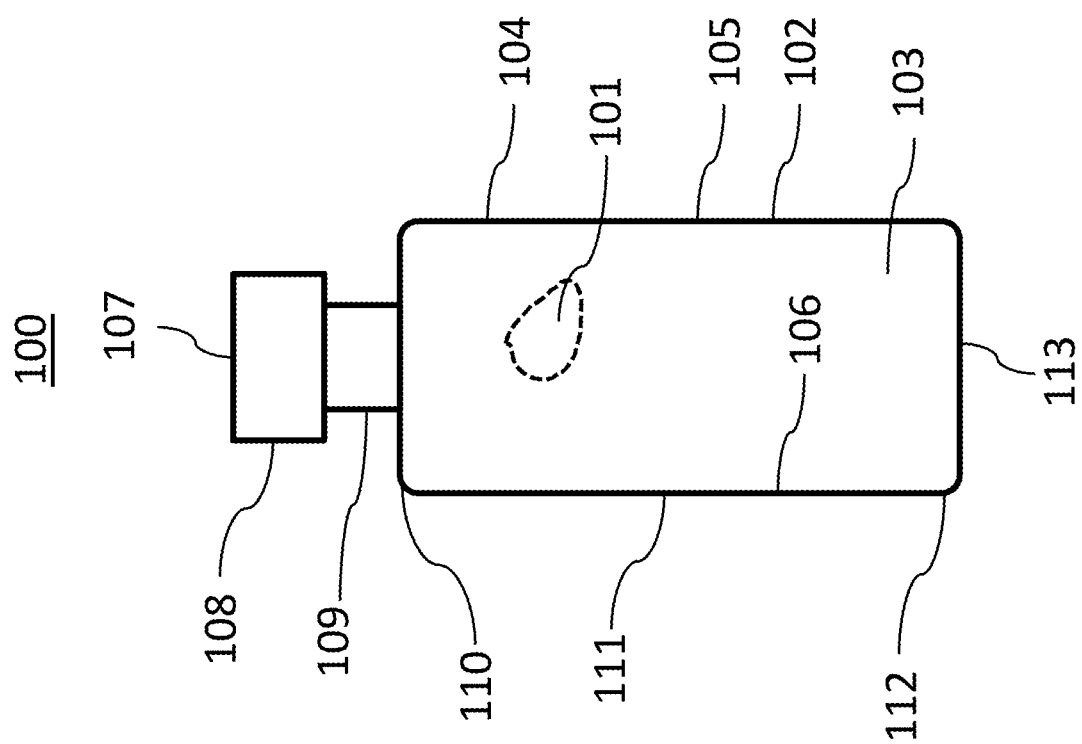
FIG. 1 illustrates a schematic depiction of an exemplary embodiment of a hollow body provided according to the invention.

The hollow body according to the invention may have any size or shape which the skilled person deems appropriate in the context of the invention. In some embodiments, the head region of the hollow body comprises an opening, which allows for inserting a pharmaceutical composition into the interior volume of the hollow body. In that case, the wall surrounds the interior volume of the hollow body only partially. The hollow body may be a glass body or a glass container in that sense that the layer of glass extends over the full area of the wall surface. In that case, the layer of glass may determine a macroscopic shape of the wall. In some embodiments, the layer of glass is of a one-piece design. The layer of glass of such a glass body or a glass container may be made by blow molding a glass melt; or by preparing a tube of a glass, such as in form of a hollow cylinder, forming the bottom of the hollow body from one end of the tube, thereby closing the tube at this end, and forming the head region of the hollow body from the opposite end of the tube. According to the nomenclature used herein, the wall of the hollow body comprises the layer of glass and every layer and every functionalization superimposed thereon. The wall surface is formed by the surface of the layer or functionalization, such as particles, which is positioned at an outermost or innermost position of the wall.

As used herein, the interior volume represents the full volume of the interior of the hollow body. This volume may be determined by filling the interior of the hollow body with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

Glass

The glass of the layer of glass may be any type of glass and may consist of any material or combination of materials which the skilled person deems suitable in the context of the invention. In some embodiments, the glass is suitable for pharmaceutical packaging and may be of type I in accordance with the definitions of glass types in section 3.2.1 of the European Pharmacopoeia, 7th edition from 2011. Additionally or alternatively to the preceding, the glass may be selected from the group consisting of a borosilicate glass, an aluminosilicate glass, and fused silica; or a combination of at least two thereof. As used herein, an aluminosilicate glass is a glass which has a content of $Al_2O_3$ of more than 8 wt.-%, such as more than 9 wt.-% or in a range from 9 to 20 wt.-%, in each case based on the total weight of the glass. An exemplary aluminosilicate glass has a content of $B_2O_3$ of less than 8 wt.-%, such as at maximum 7 wt.-% or in a range from 0 to 7 wt.-%, in each case based on the total weight of the glass. As used herein, a borosilicate glass is a glass which has a content of $B_2O_3$ of at least 1 wt.-%, such as at least 2 wt.-%, at least 3 wt.-%, at least 4 wt.-%, at least 5 wt.-%, and/or in a range from 5 to 15 wt.-%, in each case based on the total weight of the glass. An exemplary borosilicate glass has a content of $Al_2O_3$ of less than 7.5 wt.-%, such as less than 6.5 wt.-% and/or in a range from 0 to 5.5 wt.-%, in each case based on the total weight of the glass. In a further aspect, the borosilicate glass has a content of $Al_2O_3$ in a range from 3 to 7.5 wt.-%, such as in a range from 4 to 6 wt.-%, in each case based on the total weight of the glass.

The glass may be essentially free from B. Herein, the wording "essentially free from B" refers to glasses which are free from B which has been added to the glass composition by purpose. This means that B may still be present as an impurity, but may be at a proportion of not more than 0.1 wt.-%, such as not more than 0.05 wt.-%, in each case based on the weight of the glass.

Particle Size Distribution

The $D_{50}$ of a particle size distribution provides the particle diameter for which 50% of all particles of the plurality of particles having this particle size distribution have diameters smaller than this value. The $D_{10}$ of a particle size distribution provides the particle diameter for which 10% of all particles of the plurality of particles having this particle size distribution have diameters smaller than this value. The $D_{90}$ of a particle size distribution provides the particle diameter for which 90% of all particles of the plurality of particles having this particle size distribution have diameters smaller than this value. Herein, the diameter is the length of the longest straight line which starts and ends on the surface of the particle and which lies fully within the particle. In Cartesian coordinates, the length of a particle lies on one axis, the width of the particle lies on another axis and the thickness on still another axis. Here, the length is more than the width which is more than the thickness of the particle. The aspect ratio is the quotient of length divided by thickness.

Dispersion

The composition of exemplary processes provided according to the invention may be a dispersion. Generally, a dispersion is a system in which particles are dispersed in a continuous phase. There are three main types of dispersions: a coarse dispersion which is also referred to as suspension, a colloid, and a solution. A suspension is a heterogeneous mixture that contains solid particles sufficiently large for sedimentation. The particles may be visible to the naked eye, usually must be larger than 1 micrometre, and will eventually settle. A suspension is a heterogeneous mixture in which the dispersed particles do not dissolve, but get suspended throughout the bulk of the continuous phase, left floating around freely in the medium. The particles may be dispersed throughout the continuous phase through mechanical agitation, with the use of certain excipients or suspending or dispersing agents. The suspended particles are visible under a microscope and will settle over time if left undisturbed. This distinguishes a suspension from a colloid, in which the dispersed particles are smaller and do not settle. Colloids and suspensions are different from a solution, in which the particles do not exist as a solid, but are dissolved. The composition of the invention may be a dispersion in which sold particles, in particular the first plurality of particles, are dispersed in a liquid phase, referred to herein as vehicle. In the context of the composition of the invention, an exemplary dispersion is a suspension.

Vehicle

As the vehicle each vehicle which the skilled person knows and deems appropriate for being used in the context of the invention comes into consideration. Here, the vehicle is a, for example liquid, medium which allows for the at least partially superposition of the first plurality of particles onto the layer of glass in a convenient, uniform, manner. In some embodiments, the vehicle has a viscosity which is suitable for the preceding purpose. The vehicle may have a rather high vapour pressure which allows for decreasing the proportion of the vehicle in the composition through evaporation of the vehicle in the process step c) at a temperature as close to 20° C. as possible. In a case in which the composition is a dispersion, the vehicle may be the continuous, liquid, phase of the dispersion.

Dispersing Agent

In the process step b) of the process provided according to the invention, the composition may comprise one or more dispersing agents. Here, any dispersing agent which the skilled person knows and which he deems appropriate to be utilized in the context of the invention comes into consideration. In some embodiments, the dispersing agent supports keeping the particles of the plurality of particles dispersed throughout the vehicle as homogenously as possible. An exemplary dispersing agent is one selected from the group consisting of a polyacrylic acid, a polyimine, para-toluolsulfonic acid, a polyvinylpyrrolidone, a polyethylenglycol, hydroxypropylcellulose, an additive for inkjet inks, and a wetting or dispersing additive from the DISPERBYK series which is commercially available from BYK-Chemie GmbH, Wesel, Germany; or a combination of at least two thereof. Therein, a polyacrylic acid is a useful dispersing agent if the composition has a pH of more than 7. Further, a polyimine is a useful dispersing agent if the composition has a pH of less than 7. An exemplary additive for inkjet inks is an additive of the BYKJET series which is commercially available from BYK-Chemie GmbH, Wesel, Germany. In a case in which the particles of the first plurality of particles comprise, or consist of, PDMS an alternatively or additionally exemplary dispersing agent is selected from the group consisting of a silicon oligomer with short chains, a stearate, and a laurate, or from a combination of at least two thereof. An exemplary silicon oligomer with short chains has a viscosity in a range from $5 \cdot 10^{-4}$ to $100 \cdot 10^{-4}$ m$^2$/s.

Polyalkylsiloxanes

In the context of the invention, any polyalkylsiloxane which the skilled person knows and deems appropriate for any of the purposes of the invention comes into consideration for the particles of the plurality of particles of the hollow bodies provided according to the invention, and for the first and further plurality of particles of the process provided according to the invention, as well as for the plurality of particles of the use provided according to the invention. An exemplary polyalkylsiloxane is a polymethylsiloxane. An exemplary polymethylsiloxane is a polydimethylsiloxane (PDMS). An exemplary polymethylsiloxane is polysilsesquioxane.

Depyrogenation

The heating in the process step d) of the process or the heating prior the process step B) of the process or both may be a measure of a depyrogenation step. In the technical field of pharmacy, depyrogenation is a step of decreasing an amount of pyrogenic germs on a surface, such as via a heat-treatment. Therein, the amount of pyrogenic germs on the surface may be decreased as much as possible, such as by at least 80%, at least 90%, at least 95%, at least 99%, at least 99.5%, or by 100%, in each case based on an amount of the pyrogenic germs on the surface prior to the depyrogenation.

Pharmaceutical Composition

In the context of the invention, every pharmaceutical composition which the skilled person deems suitable comes into consideration. A pharmaceutical composition is a composition comprising at least one active ingredient. An exemplary active ingredient is a vaccine. The pharmaceutical composition may be fluid or solid or both. An exemplary solid composition is granular such as a powder, a multitude of tablets or a multitude of capsules. A further exemplary pharmaceutical composition is a parenteral, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

Wall

Herein, the wall of the hollow body comprises a layer of glass. The wall may comprise further layers on one or both sides of the layer of glass. The layer of glass may extends laterally throughout the wall. This means that each point on the wall surface lies on top of a point of the layer of glass. The hollow body may be a hollow body of glass. In any case, the layers of the wall are joined to one another. Two layers are joined to one another when their adhesion to one another goes beyond Van-der-Waals attraction forces. The particles of the plurality of particles, however, may be joined to the layer of glass through Van-der-Waals attraction forces, or covalent bonds, or both.

Unless otherwise indicated, the components of the wall, in particular layers and particles, may follow one another in a direction of a thickness of the wall indirectly, in other words with one or at least two intermediate components, or directly, in other words without any intermediate component. This is particularly the case with the formulation wherein one component, for example particles, superimposes another, for example the layer of glass. Further, if a component is superimposed onto a layer or a surface, this component may be contacted with that layer or surface or it may not be contacted with that layer or surface, but be indirectly overlaid onto that layer or surface with another component (e.g. a layer) in-between.

Alkali Metal Barrier Layer and Hydrophobic Layer

In some embodiments, the layer of glass of the hollow body is superimposed by an alkali metal barrier layer or by a hydrophobic layer or both, in each case towards the interior volume of the hollow body. The alkali metal barrier layer or by the hydrophobic layer or both may form at least a part of the interior surface, such as the full interior surface. The alkali metal barrier layer may consist of any material or any combination of materials which the skilled person deems suitable for providing a barrier action against migration of an alkali metal ion, such as against any alkali metal ion. The alkali metal barrier layer may be of a multilayer structure. In some embodiments, the alkali metal barrier layer comprises $SiO_2$, such as a layer of $SiO_2$. Further, the hydrophobic layer may consist of any material or any combination of materials which provides a layer surface towards the interior volume which has a contact angle for wetting with water of more than 90°. The hydrophobic layer may allow for the formation of a well-defined cake upon freeze-drying, in particular in terms of a shape of the cake. An exemplary hydrophobic layer comprises a compound of the general formula $SiO_xC_yH_z$, such as a layer of this compound. Therein, x is a number which is less than 1, such as in a range from 0.6 to 0.9 or from 0.7 to 0.8; y is a number in a range from 1.2 to 3.3, such as from 1.5 to 2.5; and z is a number as well.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Contact Angle for Wetting with Water

The contact angle of a surface for wetting with water is determined in accordance with the standard DIN 55660, parts 1 and 2. The contact angle is determined using the static method. Deviating from the standard, the measurement is conducted at curved surfaces as the wall of the hollow body is usually curved. Further, the measurements are conducted at 22 to 25° C. ambient temperature and 20 to 35% relative atmospheric humidity. A Drop Shape Analyzer—DSA30S from Krüss GmbH is applied for the measurements. Uncertainty of the measurement increases for contact angles below 10°.

Wall Thickness and Tolerance of Wall Thickness

The wall thickness and deviations from the mean value of the wall thickness (tolerance) are determined in accordance with the following standards for the respective type of hollow body:

DIN ISO 8362-1 for vials,
DIN ISO 9187-1 for ampoules,
DIN ISO 110 4 0-4 for syringes,
DIN ISO 13926-1 for cylindrical cartridges, and
DIN ISO 11040-1 for dental cartridges.

Transmission Coefficient

Herein, the transmission coefficients are defined as $T=I_{trans}/I_0$, wherein $I_0$ is the intensity of the light which is incident at a right angle on an incidence region of the surface region and $I_{trans}$ is the intensity of the light which leaves the hollow body on a side of the hollow body which is opposite to the incidence region. Hence, T refers to light which transmits the empty hollow body completely, i.e. one time through the wall into the empty interior volume and from there a second time through the wall out of the interior volume. Hence, the light transmits through two curved sections of the wall of the hollow body. The transmission coefficient is determined in accordance with the standard ISO 15368:2001(E), wherein an area of measurement of the dimensions 3 mm×4 mm is used. Further, the light is incident on the hollow body at a right angle to the vertical extension of the exterior surface of the hollow body. In some embodiments, the transmission coefficients herein refer to a hollow body of the type 2R according to DIN/ISO 8362 and to a transmission of the light through a part of the hollow body which is of the shape of a hollow cylinder. In case the transmission coefficient for a transmission of light via an unfunctionalized surface of a hollow body (herein also referred to as first transmission coefficient) is to be determined and the hollow body does not have any unfunctionalized surface which is suitable for the measurement, the functionalization (e.g. particles) is removed first and then the transmission coefficient via the surface from which the functionalization has been removed is determined.

Haze

The haze is a measure for the light scattering properties of a transparent sample, such as a glass sample. The value of the haze represents the fraction of light which has been transmitted through the sample, here the empty container, and which is scattered out of a certain spatial angle around the optical axis. Thus, the haze quantifies material defects in the sample which negatively affect transparency. Herein, the haze is determined according to the standard ASTM D 1033. In accordance with this standard, 4 spectra are measured and for each of them the transmission coefficient is calculated. The haze value in % is calculated from these coefficients of transmission. A Thermo Scientific Evolution 600 spectrometer with integrating sphere and the software OptLab-SPX are applied for the measurements. In order to allow for measuring the diffusive transmission, the sample is positioned in front of the entrance of the integrating sphere. The reflection opening is left empty such that only the transmitted and scattered fraction of the incident light is detected. The fraction of the transmitted light which is not sufficiently scattered is not detected. Further measurements pertain to detection of the scattered light in the sphere (without sample) and to the overall transmission of the sample (reflection opening closed). All the measurement results are normalized to the overall transmission of the sphere without sample which is implemented as obligatory baseline correction in the software. Herein, the haze refers to light which transmits the hollow body completely, i.e. one time through the wall into the interior volume and from there a second time through the wall out of the interior volume. Hence, the light transmits through two curved sections of the wall of the hollow body. Further, the light is incident on the hollow body at a right angle to the vertical extension of the exterior surface of the hollow body. The hollow body may be a vial of the type 2R according to DIN/ISO 8362 and the transmission is conducted through a part of the hollow body which is of the shape of a hollow cylinder. In case the haze for a transmission of light via an unfunctionalized surface of a hollow body (herein also referred to as first haze) is to be determined and the hollow body does not have any unfunctionalized surface which is suitable for the measurement, the functionalization (e.g. particles) is removed first and then the haze via the surface from which the functionalization has been removed is determined.

Scratch Test and Coefficient of Dry Sliding Friction

An MCT MikroCombiTester (MCT S/N 01-04488) from CSM Instruments is applied for the scratch test and for measuring the coefficient of dry friction. As the friction partner, a hollow body which is identical to the hollow body to be tested, including any coatings or functionalizations, is used. Further, in the test same surfaces are scratched/slide against each other. The friction partner is hold in position by a special mount above the hollow body to be tested. Here, the friction partner and the hollow body to be tested incline an angle of 90° in a top view. For both measurements, the hollow body to be tested is moved forwards, thereby scratching over the surface of the friction partner at a well-defined normal force (test force). For both tests, the hollow body to be measured is moved forwards underneath the friction partner at a velocity of 10 mm/min over a test length of 15 mm. In case of the scratch test, the test force is progressively increased from 0 to 30 N (load rate 19.99 N/min) across the test length. Afterwards, the scratched surface is checked with a microscope at a magnification of 5 times. In case of measuring the coefficient of dry sliding friction, a constant normal force of 0.5 N is applied. The lateral friction force is measured using the friction measuring table. The coefficient of dry friction is determined from the measured curves as the ratio of friction force to normal force (test force), wherein only values after the initial 0.2 mm up to the full test length of 15 mm are considered, in order to minimise the influence of the static friction.

Cover Ratio

Here, a topographical measurement of the surface to be studied is conducted with a white-light-spectrometer of the type Coherence Scanning Interferometry/Phase Shift Interferometry (CSI/PSI) from Zygo Corporation. The cover ratio is calculated from the obtained topographical image. The sum of the elevated areas is divided by the total area of measurement.

Particle Size Distribution

The particle size distribution is determined by dynamic light scattering (DLS). A Delsa™ Nano HC from Beckman Coulter is applied for the measurement. A sample of about 1 ml of the particles to be studied is taken. The sample is inserted into a plastic cuvette together with a liquid medium which is suitable for obtaining a dispersion. Therein, the liquid medium is to be chosen depending on the specific particles to be studied. In particular, the liquid medium is to be chosen such that a stable dispersion can be obtained in which the particles are visible for the measurement. In the case of the polymethylsiloxane particles (Tospearls 145A from Momentive Performance Materials Inc.) used in the examples below, n-butanol is to be used as the liquid medium. If the sample is a dispersion which is very opaque, it is diluted until the laser intensity is above 10%. The sample is measured in accordance with the standard method of the measurement device as 25° C. Therein, the algorithm calculates the diameter from 850 measurements. The standard software of the measuring device creates a diagram which shows the relative intensity of the measurements versus the particle diameter. The respective arithmetic mean and the standard deviation are provided by the software as well.

The aspect ratio of the particles is determined using an optical microscope or a scanning electron microscope. In each case, lengths and thicknesses of 10 arbitrarily chosen particles of the plurality of particles to be studied are measured and the arithmetic mean value is determined.

The invention is set out in more detail below by reference to examples and drawings, with the examples and drawings not denoting any restriction on the invention. Furthermore, unless otherwise indicated, the drawings are not to scale.

Example 1 (According to the Invention)

Preparation of the Composition:

50 g of isopropanol are provided in a beaker. 3 g of tetraethoxysilane are added to the beaker and the obtained composition is stirred for 60 s with a magnetic stirrer at ambient temperature of 20° C. Further, 3.2 g of polymethylsiloxane particles (Tospearls 145A from Momentive Performance Materials Inc.) are added. The composition is stirred for another 4 h at the ambient temperature. The thus obtained suspension is ready for use.

Functionalization with the composition:

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the composition, which has been prepared as set out above, at a velocity of 30 cm/min. Therein, the head region of the vial, including the vial opening, is not immersed into the composition in order to prevent contacting the interior surface of the vial with the composition. The vial is kept in the composition for about 10 s. Afterwards, the vial is retracted from the composition at a velocity of 5 cm/min. Subsequently, the vial is kept as it is for 10 s at ambient temperature of 20° C. Then the vial is placed with its bottom onto an absorbent substrate such as a paper towel. Then the composition which has been applied to the vial is dried by keeping the vial for 30 min at a temperature of 600° C. in an oven.

Example 2 (According to the Invention)

Preparation of the Composition:

50 g of high purity water are provided in a beaker. 3 g of tetraethoxysilane are added to the beaker and the obtained composition is stirred for 60 s with a magnetic stirrer at ambient temperature of 20° C. Subsequently, 10 g of a polydimethylsiloxane (viscosity of $50 \cdot 10^{-4}$ m$^2$/s) are added while the composition is stirred. Then, the composition is heated to 30° C. Further, 3.2 g of polymethylsiloxane particles (Tospearls 145A from Momentive Performance Materials Inc.) are added. The composition is stirred for another 4 h at 30° C. The thus obtained suspension is ready for use.

Functionalization with the Composition:

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the composition, which has been prepared as set out above, at a velocity of 30 cm/min. Therein, the head region of the vial, including the vial opening, is not immersed into the composition in order to prevent contacting the interior surface of the vial with the composition. The vial is kept in the composition for about 10 s. Afterwards, the vial is retracted from the composition at a velocity of 5 cm/min. Subsequently, the vial is kept as it is for 10 s at ambient temperature of 20° C. Then the vial is placed with its bottom onto an absorbent substrate such as a paper towel. Then the composition which has been applied to the vial is dried by keeping the vial for 10 min at a temperature of 350° C. in an oven.

Example 3 (According to the Invention)

Preparation of the Composition:

50 g of high purity water are provided in a beaker. 3 g of tetraethoxysilane are added to the beaker and the obtained composition is stirred for 60 s with a magnetic stirrer at ambient temperature of 20° C. Subsequently, 10 g of a polydimethylsiloxane (viscosity of $50 \cdot 10^{-4}$ m$^2$/s) are added while the composition is stirred. Then, the composition is heated to 30° C. Further, 3.2 g of polymethylsiloxane particles (Tospearls 145A from Momentive Performance Materials Inc.) and 0.5 g of the dispersing agent DISPERBYK-103 which is available from BYK-Chemie GmbH, Wesel, Germany are added. The composition is stirred for another 4 h at 30° C. The thus obtained suspension is ready for use.

Functionalization with the Composition:

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the composition, which has been prepared as set out above, at a velocity of 30 cm/min. Therein, the head region of the vial, including the vial opening, is not immersed into the composition in order to prevent contacting the interior surface of the vial with the composition. The vial is kept in the composition for about 10 s. Afterwards, the vial is retracted from the composition at a velocity of 5 cm/min. Subsequently, the vial is kept as it is for 10 s at ambient temperature of 20° C. Then the vial is placed with its bottom onto an absorbent substrate such as a paper towel. Then the composition which has been applied to the vial is dried by keeping the vial for 10 min at a temperature of 350° C. in an oven.

Comparative Example 1 (not According to the Invention)

A commercially available glass vial of the type "Vial 2.00 ml Fiolax clear" from Schott AG, which of the type 2R according to DIN/ISO 8362, is provided as a reference. The surface of this vial does not have any coating or functionalization.

Comparative Example 2 (not According to the Invention)

A commercially available glass vial of the type "Vial 2.00 ml Fiolax clear" from Schott AG, which of the type 2R according to DIN/ISO 8362, is coated on its exterior surface with MED10-6670 from NuSiL.

Comparative Example 3 (not According to the Invention)

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. Then the vial is placed inside a SCS Labcoater®, Model PDS 2010. Via a vacuum process, the vial is first functionalized with 3-methacrylaoxypropyltrimethoxysilane by evaporation without further heat treatment and then coated with Parylen C by evaporation at 100° C. The final coating has a film thickness of 250 nm.

Comparative Example 4 (not According to the Invention)

Preparation of the Composition:
99.8 ml of high purity water are provided in a beaker. 0.2 ml of Levasil CS50-34P (50% $SiO_2$, average particle size less than 100 nm) from Akzo Nobel N.V. are added to the beaker and the obtained composition is stirred for 30 s with a magnetic stirrer at ambient temperature of 20° C. Subsequently, 0.5 ml g of Tween20 from Sigma Aldrich are added. Then, the composition is stirred for another 10 min. The thus obtained composition is ready for use.

Functionalization with the Composition:
A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the composition, which has been prepared as set out above, at a velocity of 30 cm/min. Therein, the head region of the vial, including the vial opening, is not immersed into the composition in order to prevent contacting the interior surface of the vial with the composition. The vial is kept in the composition for 2 s. Afterwards, the vial is retracted from the composition at a velocity of 20 cm/min. Subsequently, the vial is kept as it is for 10 s at ambient temperature of 20° C. Then the vial is placed with its bottom onto an absorbent substrate such as a paper towel. Then the composition which has been applied to the vial is dried by keeping the vial for 30 min at a temperature of 600° C. in an oven.

Evaluation
For each of the examples 1 to 3 and the comparative examples 1 to 4, the contact angle for wetting with water and the coefficient of dry sliding friction are determined on the exterior surface of the vial body in accordance with the above measurement methods, respectively. The results are shown in Table 1.

TABLE 1

Characterization of the exterior surfaces of the glass vials of the examples and comparative examples by their contact angles for wetting with water and coefficients of dry sliding friction, in each case prior to any post treatment.

| Example | Contact angle for water [°] | Coefficient of dry sliding friction |
|---|---|---|
| Example 1 | 34 | 0.01 |
| Example 2 | 26 | 0.18 |

TABLE 1-continued

Characterization of the exterior surfaces of the glass vials of the examples and comparative examples by their contact angles for wetting with water and coefficients of dry sliding friction, in each case prior to any post treatment.

| Example | Contact angle for water [°] | Coefficient of dry sliding friction |
|---|---|---|
| Example 3 | 43 | 0.20 |
| Comparative example 1 | <10 | 0.5 |
| Comparative example 2 | 70 | 0.28 |
| Comparative example 3 | 93 | 0.45 |
| Comparative example 4 | <10 | 0.41 |

Further, 10,000 Of the vials of each example and comparative example, respectively, are processed on a standard pharmaceutical filling line and thus, filled with an influenza vaccine. Table 2 below shows an evaluation of the vials regarding their tendency to be damaged or even break on the filling line. Here, ++ means that no or only very few vials are being damaged or broken, + means that few vials are being damaged or broken, − means that damages to vials and broken vials occur more often than for +, −− means that damages to vials and broken vials occur more often than for −.

TABLE 2

Comparison of the tendency of the glass vials to be damaged on the filling line for the examples and comparative examples

| Example | Low tendency to damages on filling line |
|---|---|
| Example 1 | ++ |
| Example 2 | + |
| Example 3 | + |
| Comparative example 1 | −− |
| Comparative example 2 | − |
| Comparative example 3 | − |
| Comparative example 4 | −− |

Figure 11:
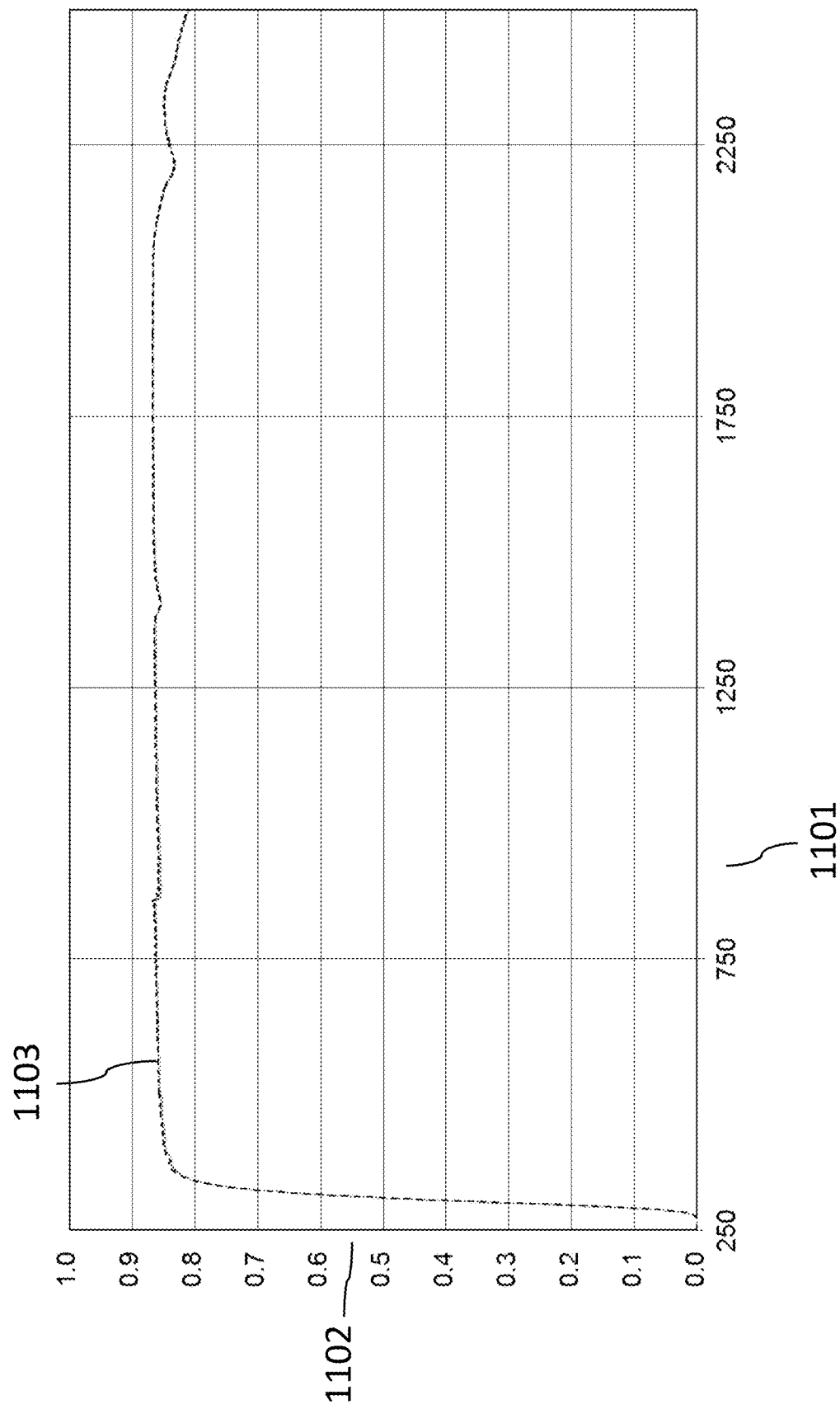
FIG. 11 illustrates results of measurements of the transmission coefficient of exemplary vials and the comparative example.

Further, the vials of the examples and of the comparative example 1 are studied for their optical characteristics which may influence an optical inspection of the vials, in particular for pharmaceutically relevant particles, after being filled with a vaccine and being closed. These studies are conducted prior to filling the vials. Here, the increase of the haze by the functionalizations of the examples 1 to 3 is determined in accordance with the above measurement method to be less than 0.3% of the haze of an unfunctionalized reference vial of comparative example 1. Further, the transmission coefficients of vials of the examples 1 to 3 and of a reference vial of comparative example 1 are determined in accordance with the above measurement method. FIG. 11 shows the transmission coefficients of empty vials of the examples 1 to 3 and of comparative example 1 across a broad spectral range. From this figure, it can clearly be seen that the functionalizations according to the examples 1 to 3 do not significantly deteriorate the transmission coefficient in the studied spectral range.

For further studies, functionalized surfaces of vials according to the examples 1 to 3 and the comparative example 1 have been subjected to a scratch test which is described in detail in the above measurement methods sections. It has been shown that the vials according to the examples 1 to 3 show an improvement of their scratch resistance with respect to the reference vial of comparative example 1 at least up to test forces of 5 N.

Post-Treatment

For further studies, the vials of the examples 1 and 2 and of the comparative example 1 as reference are subjected to three different kinds of post-treatment, i.e. a washing procedure, a depyrogenation procedure and a freeze drying. These kinds of post-treatment are described below. The washing procedure is the same as used prior to functionalizing/coating the vials in the examples 1 to 3 and of the comparative examples 2 to 4. Also the reference vial of comparative example 1 has been washed as described below.

Washing:

A HAMO LS 2000 washing machine is applied for the washing procedure. The HAMO LS 2000 is connected to the purified water supply. Further, the following devices are used.

cage 1: 144 with 4 mm nozzles
cage 2: 252 with 4 mm nozzles drying cabinet from Heraeus (adjustable up to 300° C.)

The tap is opened. Then the machine is started via the main switch. After conducting an internal check, the washing machine shows to be ready on the display. Program 47 is a standard cleaning-program which operates with the following parameters:

pre-washing without heating for 2 min
washing at 40° C. for 6 min
pre-rinsing without heating for 5 min
rinsing without heating for 10 min
end-rinsing at without heating for 10 min
drying without heating for 5 min The holder for the vials in the cages 1 and 2 have to be adjusted considering the size of the vials in order to obtain a distance of the nozzle of about 1.5 cm. The vials to be washed are placed on the nozzles with the head first. Subsequently, the stainless steel mesh is fixed on the cage. The cage is oriented to the left and pushed into the machine. Then the machine is closed. Program 47 (GLAS040102) is selected and then the HAMO is started via START. After the program has finished (1 h), the cages are taken out and the vials are placed with their opening facing downwards in drying cages. A convection drying cabinet with ambient air filter is applied for the drying. The drying cabinet is adjusted to 300° C. The vials are placed into the drying cabinet for 20 min. After the vials have cooled down, they are sorted into appropriate boxes.

Depyrogenation:

The vials are depyrogenised by placing them in an oven which is heated to 350° C. This temperature is kept constant for 1 h. Subsequently, the vials are taken out of the oven and left to cool down.

Freeze drying:
The vials are freeze dried by storing them for 4 hours at −70° C.

Evaluation after Post-Treatment

Vials of the examples 1 and 2 have been subjected to various combinations of the above types of post-treatment. As a reference, vials of comparative example 1 have been subjected to the depyrogenation treatment as well.

Figure 10:
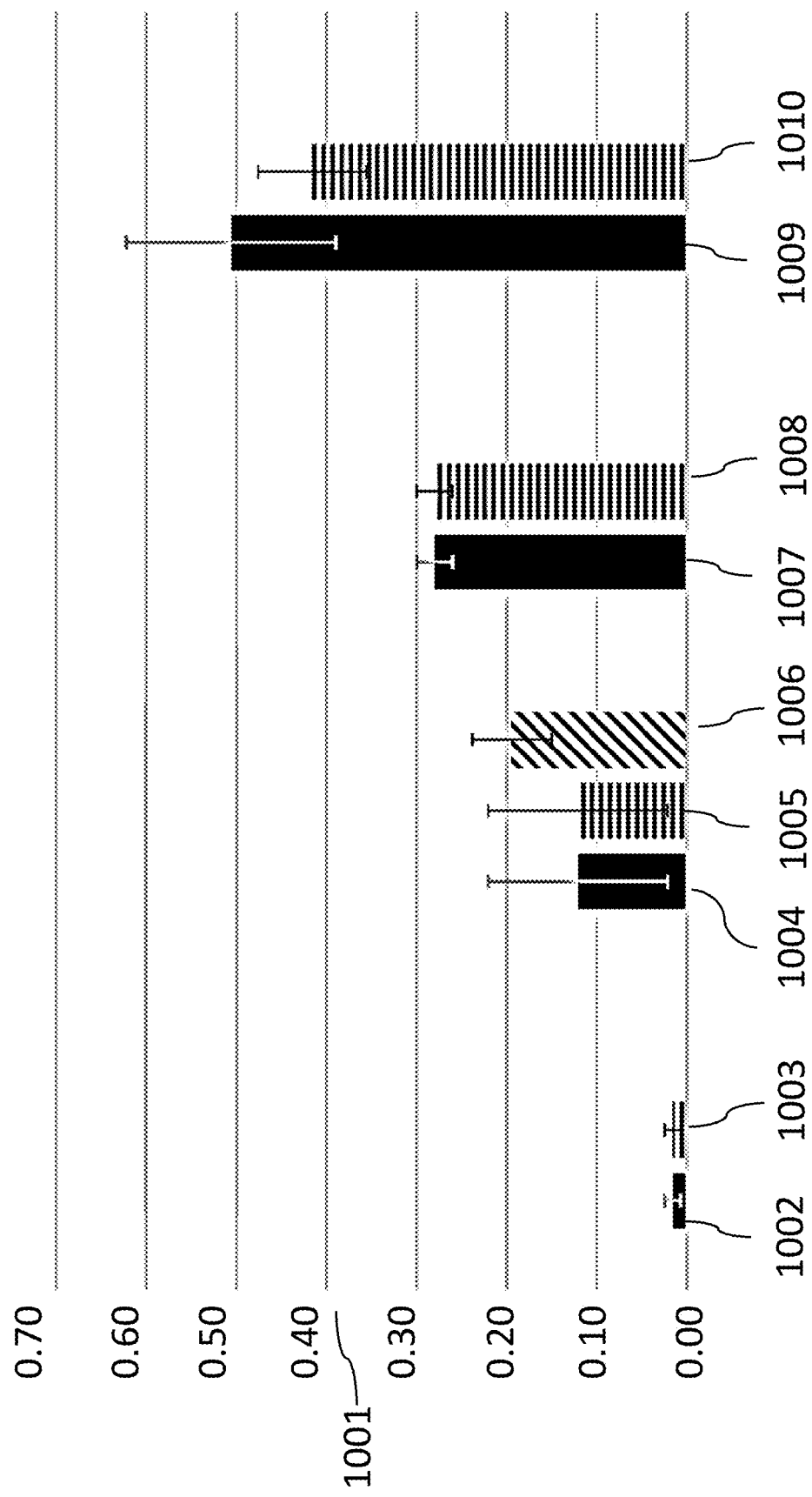
FIG. 10 illustrates a diagram with results of measurements of the coefficient of dry sliding friction of exemplary vials and comparative examples.

In each case, the coefficient of dry sliding friction has been determined on the exterior surfaces of the vials in their tubular body regions. The results are shown in FIG. 10. FIG. 10 compares, from left to right, the coefficients of dry sliding friction of vials of example 1 (no post-treatment, after depyrogenation), example 2 (no post-treatment, after depyrogenation, after freeze drying, after washing, after washing and depyrogenation) and of comparative example 1 (no post-treatment, after depyrogenation). It is demonstrated that the functionalizations of examples 1 and 2 withstand the washing procedure as well as the depyrogenation procedure and the freeze drying.

For further studies, vials according to the examples 1 to 3 have been washed as described above. Then the washed vials have been broken such that the interior surfaces became accessible for measurements of the contact angle for wetting with water. Those measurements have been conducted at 5 different positions (1 to 5) on the interior surface which are depicted schematically in FIG. 8. The measurement results for vials of example 1 are shown in FIG. 9.

Figure 14:
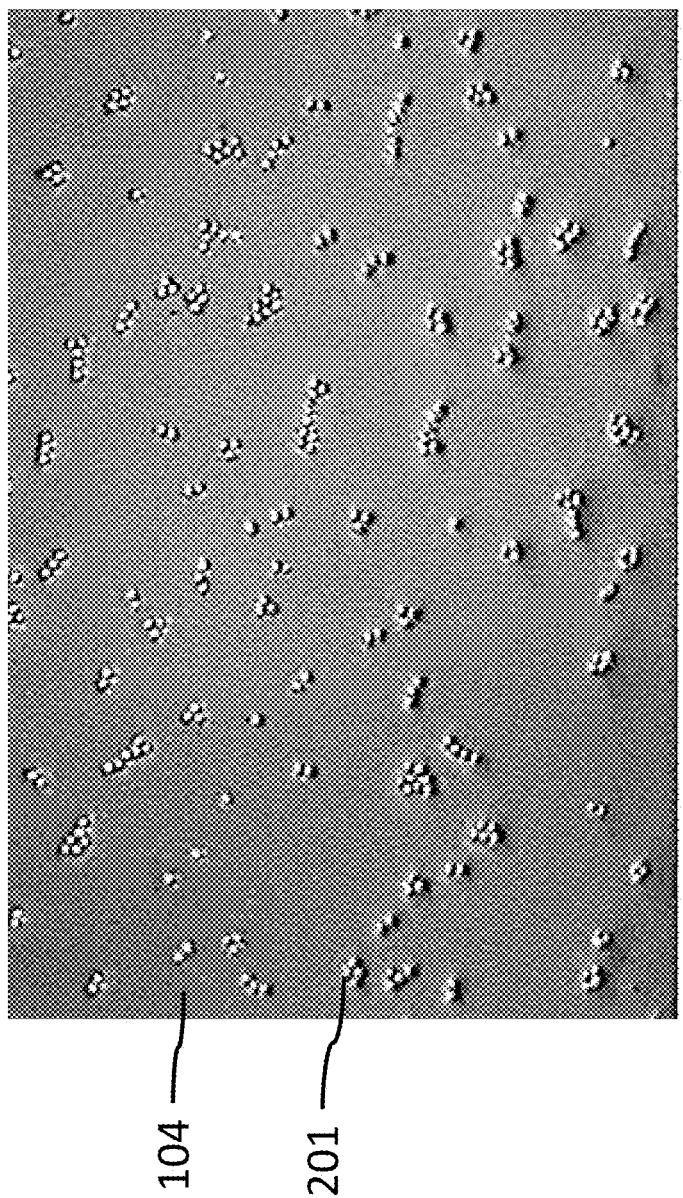
FIG. 14 illustrates a microscope image of the exterior surface of an exemplary vial prior to freeze drying.

Even further tests have been conducted, in that vials according to the examples 1 to 3 have been freeze dried. Prior to and after this procedure the functionalized surfaces have been checked for damages and defects under the microscope at a magnification of 5 to 20 times. It has been observed that no defects or damages have been caused by the freeze-drying procedure. FIG. 14 shows the exterior surface of a vial of example 2 prior to freeze-drying and FIG. 15 after freeze drying. No damages or defects are observed.

FIG. 1 shows a schematic depiction of an exemplary embodiment of a hollow body 100 provided according to the invention. The hollow body 100 comprises a wall 102 which partially surrounds an interior volume 101 of the hollow body 100. The wall 102 surrounds the interior volume 101 only partially in that the hollow body 100 comprises an opening 107 which allows for filling the hollow body 100 with a pharmaceutical composition 301 (not shown). The wall 102 forms from top to bottom in the FIG. 1: a top region of the hollow body 100, which consists of a flange 108 and a neck 109; a body region 111, which follows the top region via a shoulder 110; and a bottom region 113, which follows the body region 111 via a heel 112. Here, the body region 111 is a lateral region of the hollow body 100 in form of a hollow cylinder. The wall 102 comprises a layer of glass 104 and a wall surface 103, wherein the layer of glass 104 extends across the full area of the wall surface 103. The wall surface 103 consists of an interior surface 106 which faces the interior volume 101, and an exterior surface 105 which faces away from the interior volume 101. Here, the part of the exterior surface 105 which lies in the body region 111 of the hollow body 1100 forms a surface region of the wall surface 103, which is characterized by a coefficient of dry sliding friction of 0.02.

Figure 2:
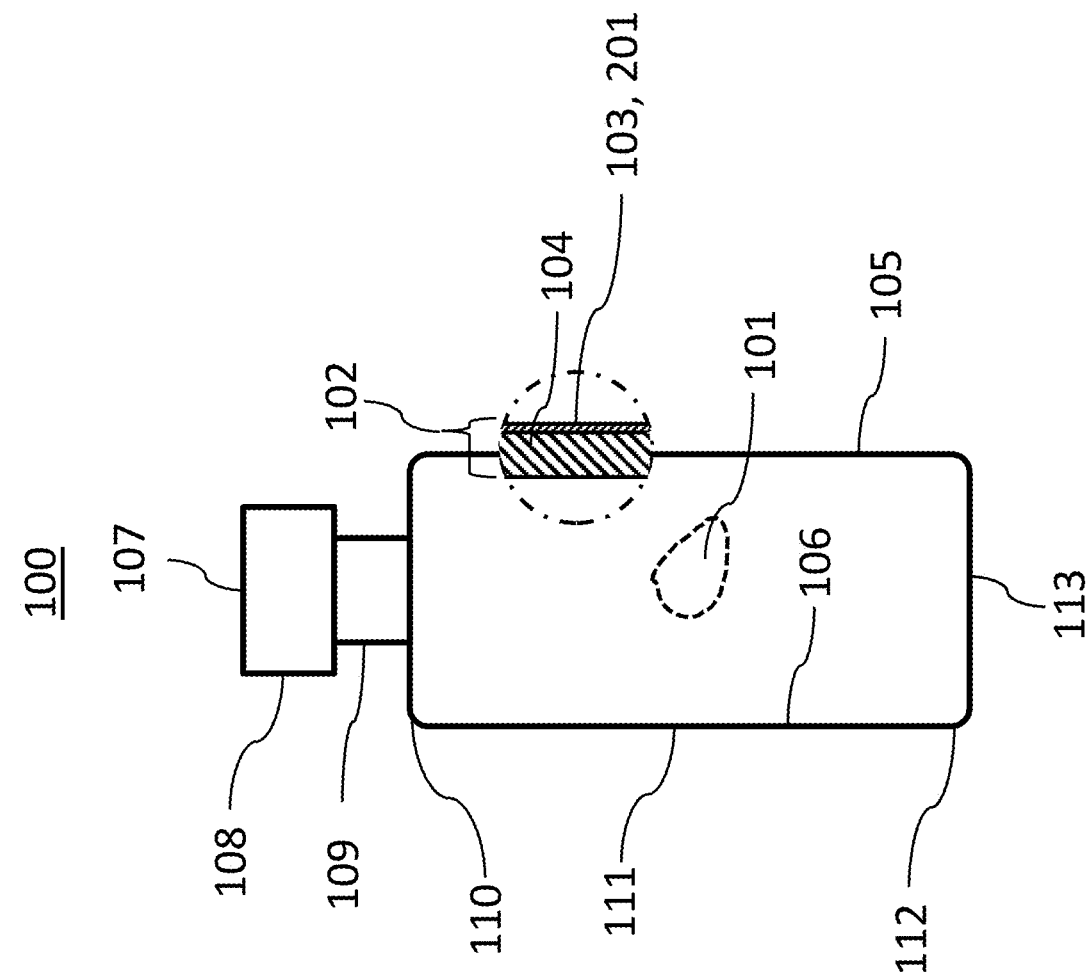
FIG. 2 illustrates a schematic depiction of another exemplary embodiment of a hollow body provided according to the invention.

FIG. 2 illustrates a schematic depiction of a further hollow body 100 provided according to the invention.

The hollow body 100 of FIG. 2 is a vial which has been obtained in accordance with example 1 according to the invention as explained above. This vial is of the same shape as the hollow body 100 of FIG. 1. Deviating from FIG. 1, the vial of FIG. 2 has a coefficient of dry sliding friction of 0.01 across its exterior surface 105. Moreover, a plurality of spherical particles 201 is directly joined to the layer of glass 104 across the exterior surface 105 of the wall 102. The particles 201 are $SiO_2$-particles which have been obtained from the PDMS-particles which have been applied to the exterior surface 105 of the vial according to example 1.

Figure 3:
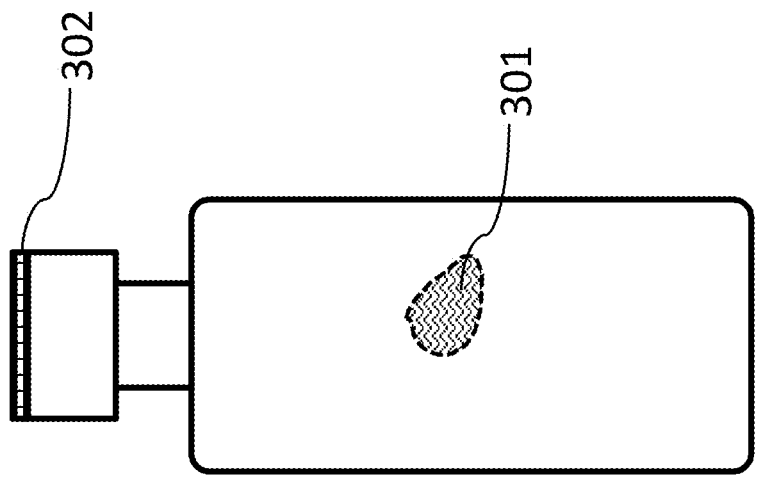
FIG. 3 illustrates a schematic depiction of exemplary embodiments of a closed hollow body and a closed container provided according to the invention.

FIG. 3 illustrates a schematic depiction of an exemplary embodiment of a closed hollow body 300 provided according to the invention which is also a closed container 300 according to the invention. Further, this closed container 300 is a vial which has been obtained by filling the hollow body 100 of FIG. 2 with a pharmaceutical composition 301 and closing the opening 107 with a lid 302 via a crimping step. Here, the pharmaceutical composition 301 is a vaccine.

Figure 4:
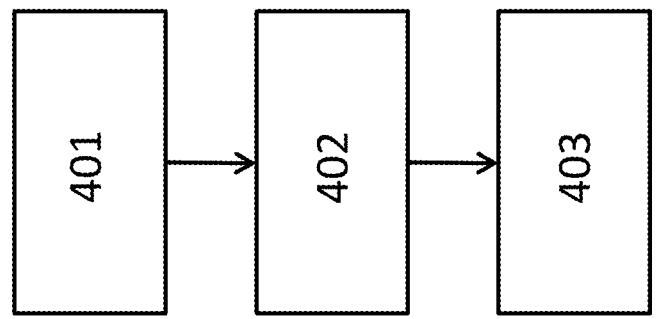
FIG. 4 illustrates a flow chart of an exemplary embodiment of a process provided according to the invention for the preparation of a hollow body.

FIG. 4 illustrates a flow chart of an exemplary embodiment of a process 400 provided according to the invention for the preparation of a hollow body 100. The process 400 comprises a process step a) 401 in which a commercially available glass vial of the type "Vial 2.00 ml Fiolax clear" from Schott AG which of the type 2R according to DIN/ISO 8362 is provided. A process step b) 402 of partially superimposing a layer of glass 104 of the vial with a composition is conducted as described above for example 1. Accordingly, the composition comprises isopropanol as vehicle and a plurality of PDMS-particles 201. Also the step c) 403 of decreasing a proportion of the isopropanol in the composition is conducted as described in the context of example 1. Thereby, the hollow body 100 of FIG. 2 is obtained, in which $SiO_2$-particles are joined to the layer of glass 104 across the full exterior surface 105 of the vial.

Figure 5:
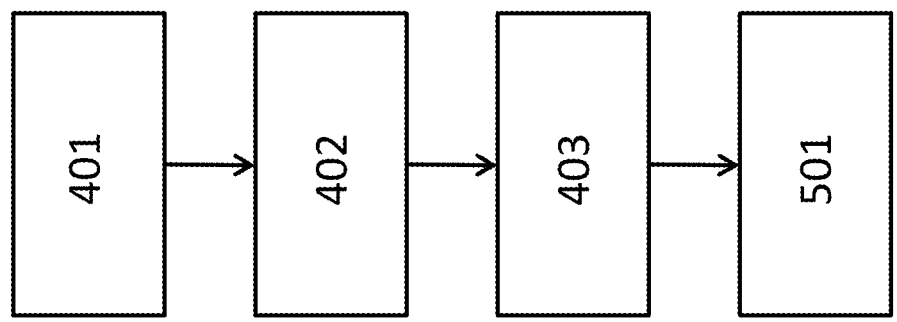
FIG. 5 illustrates a flow chart of another exemplary embodiment of a process provided according to the invention for the preparation of a hollow body.

FIG. 5 illustrates a flow chart of another exemplary embodiment of a process 500 provided according to the invention for the preparation of a hollow body 100. The process 500 of FIG. 5 comprises the process steps a) 401 to c) 403 of the process 400 according to FIG. 4 and further, a process step d) 501 of depyrogenising the hollow body 100 in accordance with the above described depyrogenation process.

Figure 6:
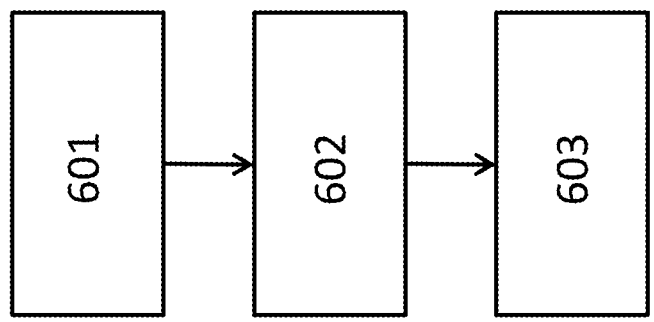
FIG. 6 illustrates a flow chart of an exemplary embodiment of a process provided according to the invention for packaging a pharmaceutical composition.

FIG. 6 illustrates a flow chart of an exemplary embodiment of a process 600 provided according to the invention for packaging a pharmaceutical composition 301. In a process step A) 601, the hollow body 100 according to FIG. 2 is provided. In a process step B) 602, a pharmaceutical composition 301 is filled into the interior volume 101 of the hollow body 100, and in a process step C) 603 the opening 107 of the hollow body 100 is closed, thereby obtaining the closed hollow body 300 of FIG. 3.

Figure 7:
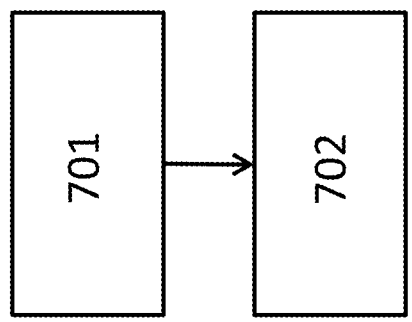
FIG. 7 illustrates a flow chart of an exemplary embodiment of a process provided according to the invention for treating a patient.

FIG. 7 illustrates a flow chart of an exemplary embodiment of a process 700 provided according to the invention for treating a patient. The process 700 comprises the process steps of: A. 701 providing the closed hollow body 300 of FIG. 3, opening the closed hollow body 300 by penetrating the lid 302 with a needle of a syringe, filling the syringe with the vaccine; and B. 702 administering the vaccine subcutaneously to a patient using the syringe.

Figure 8:
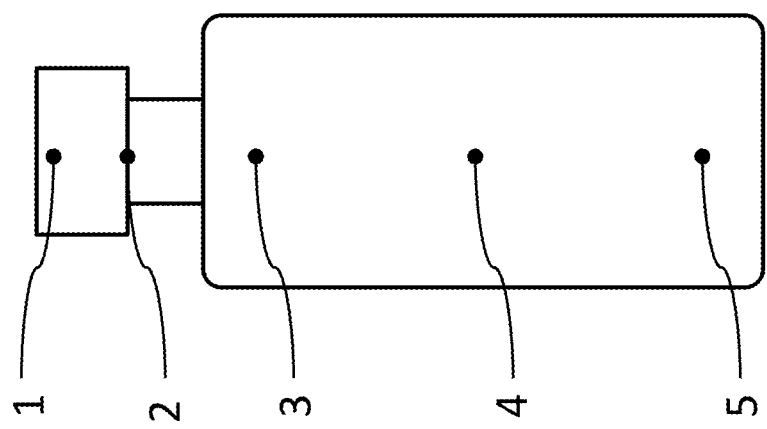
FIG. 8 illustrates a schematic depiction of the positions on the interior surface of vials at which the contact angle for wetting with water has been measured in the studies of contamination of the interior surface due to a washing process.
Figure 9:
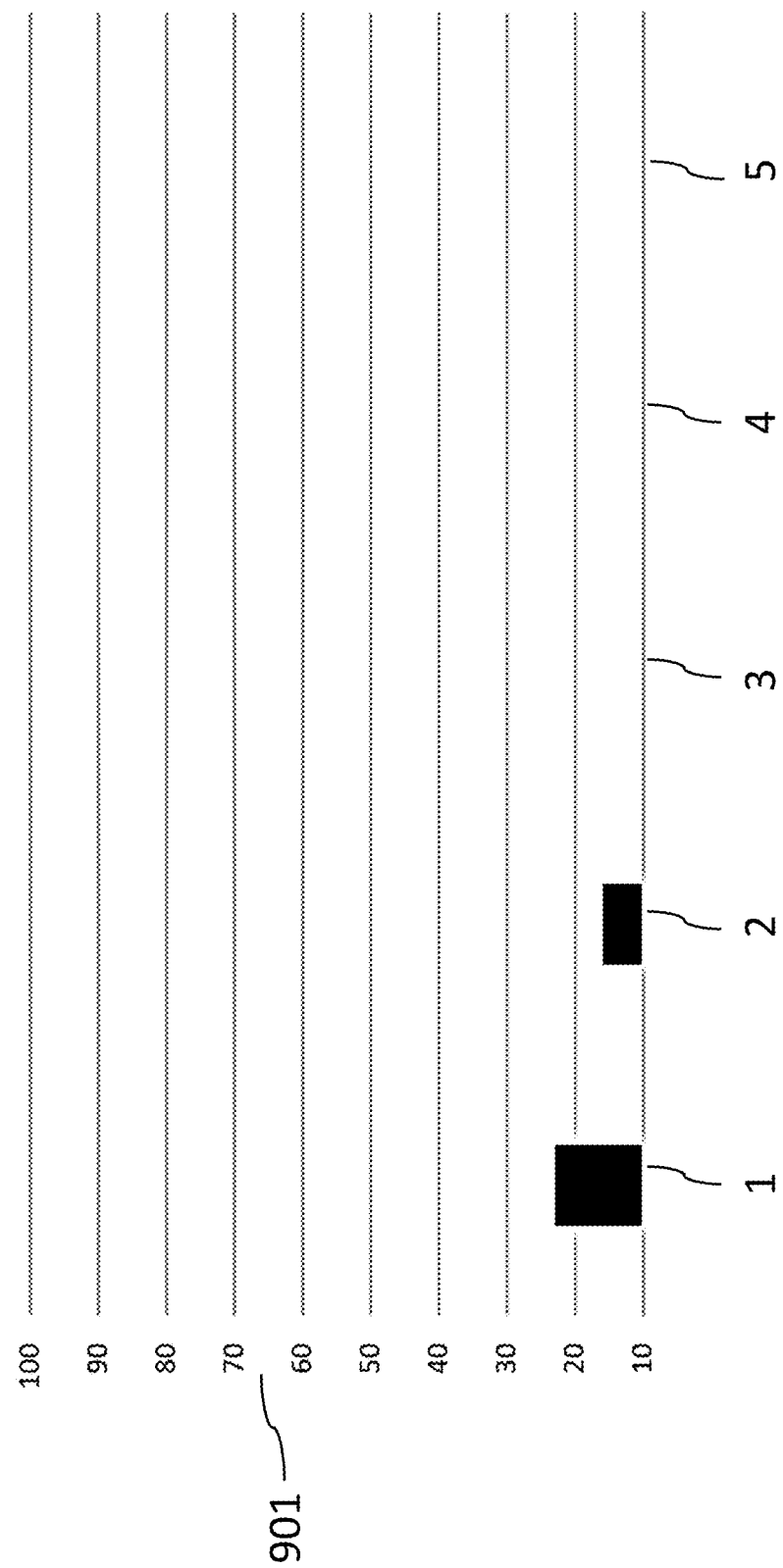
FIG. 9 illustrates results of the studies of contamination of the interior surface due to a washing process for exemplary vials.

FIG. 8 illustrates a schematic depiction of the positions 1 to 5 on the interior surface 106 of vials at which the contact angle for wetting with water has been measured in the studies of contamination of the interior surface 106 due to a washing process.

FIG. 9 illustrates results of the studies of contamination of the interior surface 106 due to a washing process for vials of example 1. Here, the contact angle 901 for wetting with water is plotted for each position 1 to 5. At the positions 3 to 4, the contact angle 901 is below 10° (similar to the reference comparative example 1, see Table 1 above). This shows that the interior surface 106 has not been contaminated with the $SiO_2$-particles which have been obtained on the exterior surface 105 from the PDMS-particles due to the washing process.

FIG. 10 illustrates a diagram with results of measurements of the coefficient of dry sliding friction 1001 of vials of examples 1 and 2 and comparative example 1. Here, bar 1002 shows the result for vials of example 1 without any post-treatment. Bar 1003 shows the results for vials of example 1 after the vials have been depyrogenised as outlined above. Bars 1004 to 1008 show results for vials of example 2, from left to right: bar 1004 without any post-treatment, bar 1005 after depyrogenation, bar 1006 after freeze drying, bar 1007 after washing only, bar 1008 after washing and subsequent depyrogenation. Bar 1009 shows the results for vials of comparative example 1 after washing the vials and bar 1010 shows the results for vials of comparative example 1 after washing and depyrogenising them.

FIG. 11 illustrates results of measurements of the transmission coefficient 1102 of vials according to the examples 1 to 3 and the comparative example 1 over the wavelength in nm 1101. In the diagram, 1103 denotes the measurement results for the examples 1 to 3 and comparative example 1. All these results are so close to each other that the corresponding graphs appear as one in the diagram. The dip at 865 nm is a measurement artefact.

Figure 12:
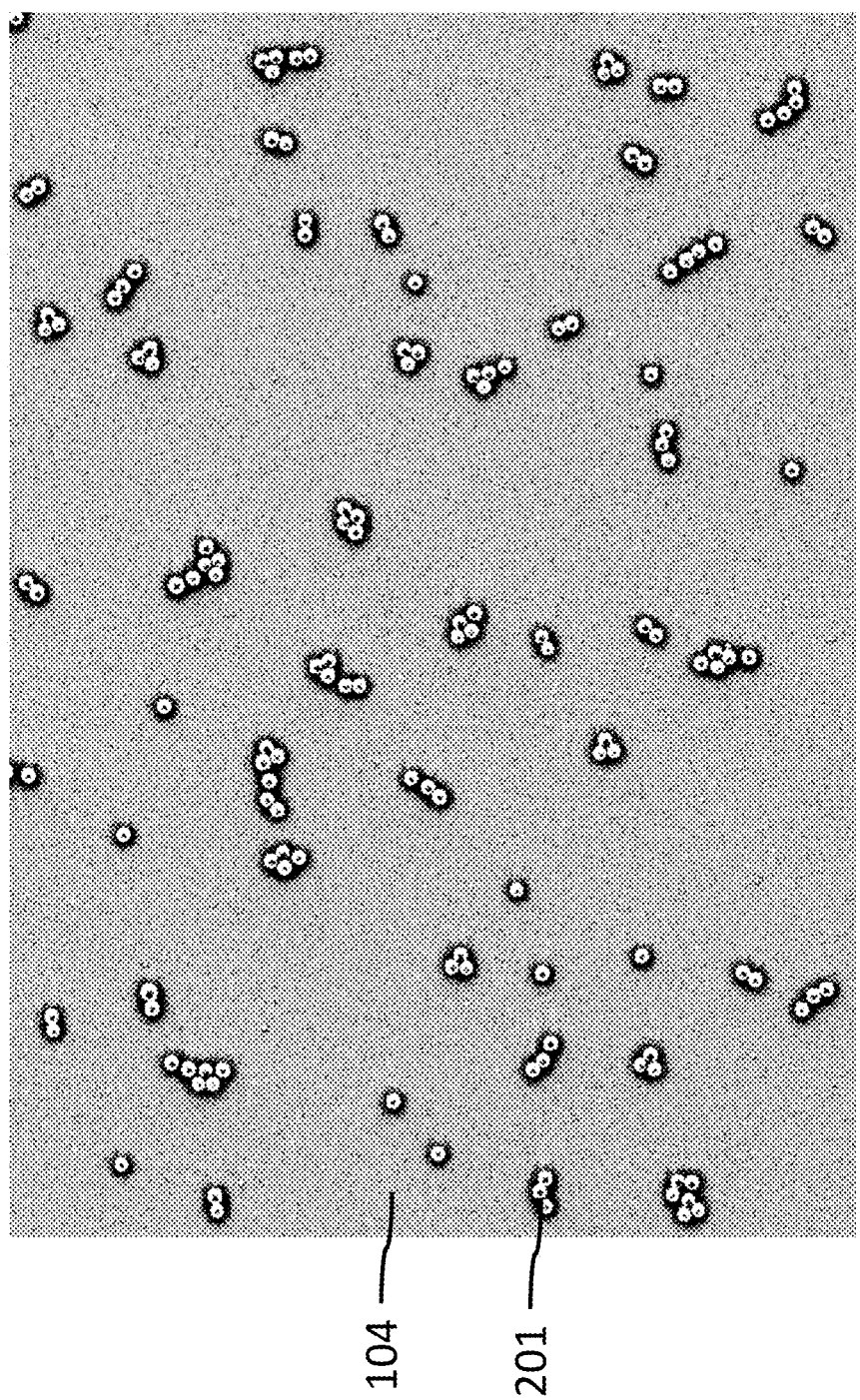
FIG. 12 illustrates a microscope image of the exterior surface of an exemplary vial.

FIG. 12 illustrates a microscope image of the exterior surface 105 of a vial according to example 1. The image has been obtained using the following parameters: acceleration voltage (EHT)=5.99 kV, working distance (WD)=6.9 mm, magnification=1.00 k X. The plurality of particles 201 can clearly be seen on the layer of glass 104.

Figure 13:
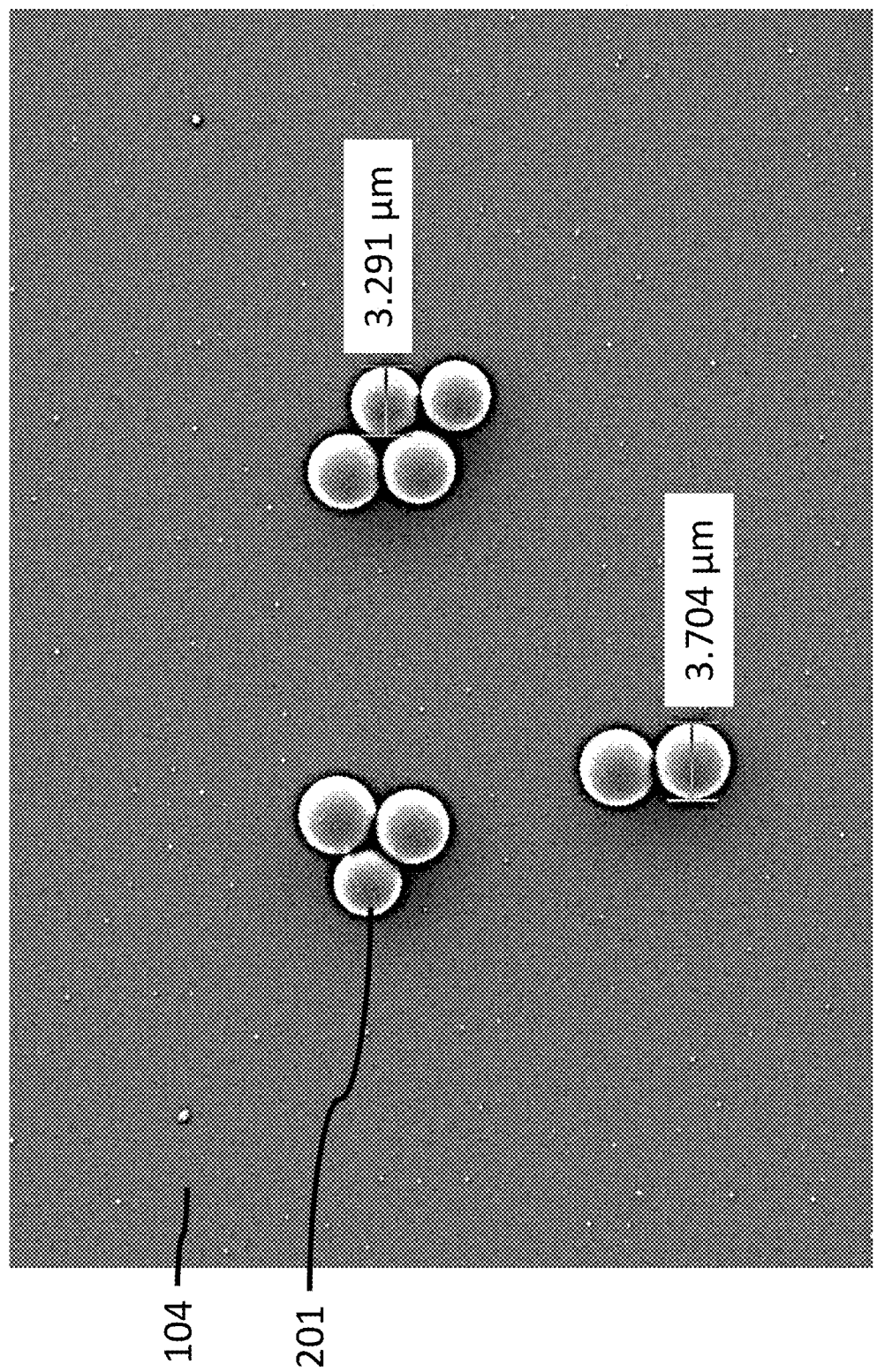
FIG. 13 illustrates a further microscope image of the exterior surface of an exemplary vial.

FIG. 13 illustrates a further microscope image of the exterior surface 105 of a vial according to example 1. The image has been obtained using the following parameters: acceleration voltage (EHT)=5.00 kV, working distance (WD)=7.0 mm, magnification=5.00 k X. The plurality of particles 201 can clearly be seen on the layer of glass 104. The diameters of two exemplary particles are shown in the figure to be at 3.292 µm and 3.704 µm, respectively.

FIG. 14 illustrates a microscope image of the exterior surface 105 of a vial according to example 2 prior to freeze drying. The plurality of particles 102 can be seen on the layer of glass 104.

Figure 15:
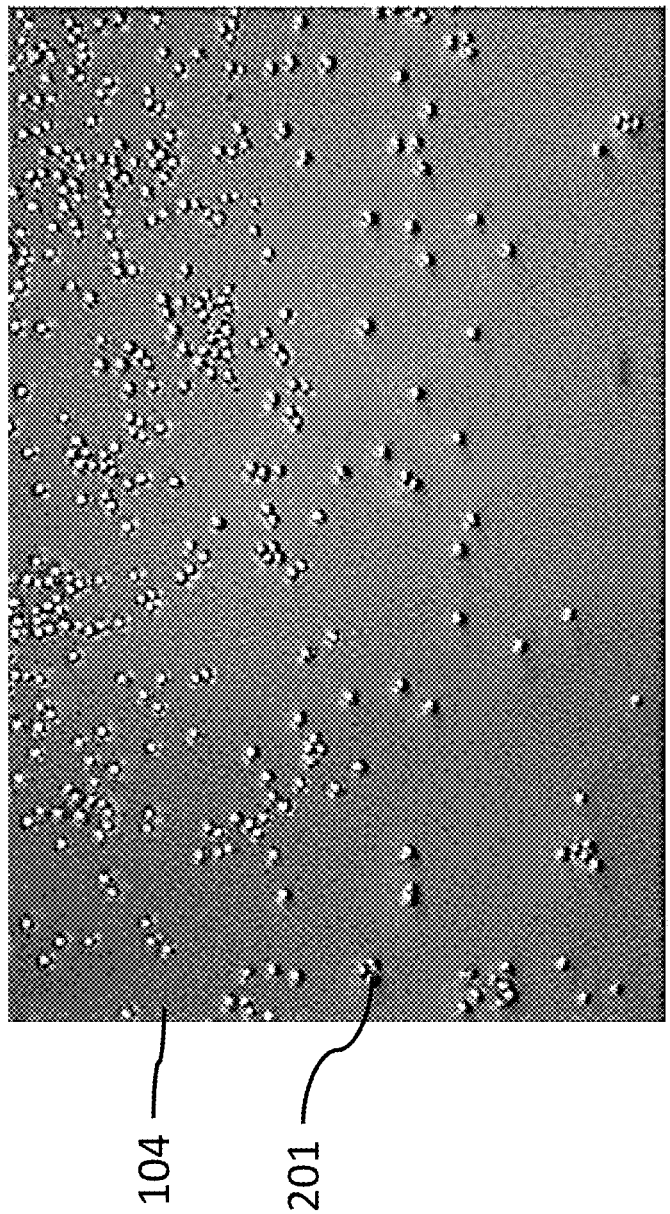
FIG. 15 illustrates a microscope image of the exterior surface of an exemplary vial after freeze drying.

FIG. 15 illustrates a microscope image of the exterior surface of the vial according to example 2 of FIG. 14 after freeze-drying. The plurality of particles 102 can be seen on the layer of glass 104. No defects or damages from the freeze-drying are visible.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

100 hollow body according to the invention
101 interior volume
102 wall
103 wall surface
104 layer of glass
105 exterior surface
106 interior surface
107 opening
108 flange
109 neck
110 shoulder
111 body region
112 heel
113 bottom region
201 particles of plurality of particles
300 closed container according to the invention/closed hollow body according to the invention
301 pharmaceutical composition
302 lid 400 process according to the invention for the preparation of a hollow body
401 process step a)
402 process step b)
403 process step c)
500 process according to the invention for the preparation of a hollow body
501 process step d)
600 process according to the invention for packaging a pharmaceutical composition
601 process step A)
602 process step B)
603 process step C)
700 process according to the invention for treating a patient
701 process step A.
702 process step B.
901 contact angle for wetting with water in °
1 to 5 positions of measurement of the contact angle for wetting with water on the interior surface after the washing procedure
1001 coefficient of dry sliding friction
1002 measurement results for example 1 without post-treatment
1003 measurement results for example 1 after depyrogenation
1004 measurement results for example 2 without post-treatment
1005 measurement results for example 2 after depyrogenation
1006 measurement results for example 2 after freeze drying
1007 measurement results for example 2 after washing without further post-treatment
1008 measurement results for example 2 after washing and depyrogenation
1009 measurement results for comparative example 1 after washing without further post-treatment
1010 measurement results for comparative example 1 after washing and depyrogenation
1101 wavelength in nm
1102 transmission coefficient
1103 measurement results for examples 1 to 3 and comparative example 1

What is claimed is:

1. A hollow body, comprising:
   a wall which at least partially surrounds an interior volume of the hollow body, the wall comprising a layer of glass and having a wall surface with a surface region; and
   a plurality of particles at least partially superimposing the layer of glass in the surface region of the wall surface, the plurality of particles being characterized by a particle size distribution having a $D_{50}$ in a range from 1 µm to 100 µm, wherein the plurality of particles is not embedded in any material and the surface region is characterized by a coefficient of dry sliding friction of less than 0.15.

2. The hollow body of claim 1, wherein the particles of the plurality of particles are selected from the group consisting of organic particles, inorganic particles, hybrid polymer particles, or a combination of at least two thereof.

3. The hollow body of claim 2, wherein the particles comprise inorganic particles and the inorganic particles are selected from the group consisting of a boron nitride, a molybdenum sulfide, a silicon nitride, an oxide, a compound which includes covalently bonded H, or a combination of at least two thereof.

4. The hollow body of claim 1, wherein the particles of the plurality of particles comprise a compound which includes covalently bonded H.

5. The hollow body of claim 1, wherein the particles of the plurality of particles adjoin the layer of glass in the surface region of the wall surface.

6. The hollow body of claim 1, wherein the particles of the plurality of particles are not superimposed by any component of the wall surface on a side of the particles of the plurality of particles which faces away from the layer of glass.

7. The hollow body of claim 1, wherein the particles of the plurality of particles are characterized by an aspect ratio in a range from 0.5 to 1.5.

8. A hollow body, comprising:
   a wall which at least partially surrounds an interior volume of the hollow body, the wall comprising a layer of glass and having a wall surface, the wall surface comprising a surface region which is characterized by a coefficient of dry sliding friction of less than 0.15; and
   a plurality of particles at least partially superimposing the layer of glass in the surface region of the wall surface that is characterized by a particle size distribution having a $D_{50}$ in a range from 1 µm to 100 µm.

9. The hollow body of claim 8, wherein the surface region is further characterized by a contact angle for wetting with water in a range from 0° to 45°.

10. The hollow body of claim 8, wherein the hollow body is a container.

11. The hollow body of claim 10, wherein the container is a packaging container for at least one of a medical packaging good or a pharmaceutical packaging good.

12. A process for making an item, the process comprising as process steps:
   a) providing a hollow body comprising a wall which at least partially surrounds an interior volume of the hollow body, the wall comprising a layer of glass and having a wall surface;
   b) superimposing at least a part of the layer of glass with a composition comprising a first plurality of particles and a vehicle; and
   c) decreasing a proportion of the vehicle in the composition, thereby leaving at least a part of the first plurality of particles or a further plurality of particles, which is obtained in the process step c) from at least a part of the first plurality of particles, or a combination of the first plurality of particles and the further plurality of particles superimposed on the layer of glass in a surface region of the wall surface, the superimposed plurality of particles on the surface region being characterized by a particle size distribution having a $D_{50}$ in a range from 1 to 100 µm, wherein the surface region is characterized by a coefficient of dry sliding friction of less than 0.15.

13. The process of claim 12, wherein in the process step b) the composition comprises the first plurality of particles at a proportion in a range from 0.1 wt.-% to 25 wt.-%, based on the weight of the composition in the process step b).

14. The process of claim 12, wherein in the process step b) the layer of glass is contacted with the composition.

15. A closed container, comprising:
   a wall at least partially surrounding an interior volume which comprises a pharmaceutical composition, the wall comprising a layer of glass and having a wall surface comprising a surface region, the closed container meeting both of the following criteria:

A. the layer of glass is at least partially superimposed by a plurality of particles in the surface region, the plurality of particles being characterized by a particle size distribution having a $D_{50}$ in a range from 1 to 100 µm; and B. the surface region is characterized by a coefficient of dry sliding friction of less than 0.15.

16. A process, comprising as process steps:
providing a hollow body comprising a wall which at least partially surrounds an interior volume of the hollow body, the wall comprising a layer of glass and having a wall surface with a surface region, and a plurality of particles at least partially superimposing the layer of glass in the surface region of the wall, the plurality of particles being characterized by a particle size distribution having a $D_{50}$ in a range from 1 µm to 100 µm, wherein the surface region is characterized by a coefficient of dry sliding friction of less than 0.15;
inserting a pharmaceutical composition into the interior volume; and
closing the hollow body.

17. A process, comprising:
using a plurality of particles to adjust a coefficient of dry sliding friction of a surface of glass of a container to be less than 0.15, the plurality of particles being characterized by a particle size distribution having a $D_{50}$ in a range from 1 µm to 100 µm.

* * * * *

UNITED STATES PATENT AND TRADEMARK OFFICE
CERTIFICATE OF CORRECTION

| | |
|---|---|
| PATENT NO. | : 11,504,943 B2 |
| APPLICATION NO. | : 16/408771 |
| DATED | : November 22, 2022 |
| INVENTOR(S) | : Stephanie Mangold et al. |

It is certified that error appears in the above-identified patent and that said Letters Patent is hereby corrected as shown below:

On the Title Page

Item [56] Under U.S. PATENT DOCUMENTS, insert the following:
--648,579 5/1900 Bartlett
3,418,153 12/1968 Levene
4,224,365 9/1980 Ali-Zaidi
4,420,578 12/1983 Hagens et al.
5,553,683 9/1996 Wenzel et al.
6,485,794 11/2002 Li et al.
8,053,492 11/2011 Poe et al.
9,763,852 9/2017 Fadeev et al.--.

Signed and Sealed this
Seventeenth Day of September, 2024

Katherine Kelly Vidal
*Director of the United States Patent and Trademark Office*